United States Patent
Fujita et al.

(10) Patent No.: US 6,684,127 B2
(45) Date of Patent: Jan. 27, 2004

(54) METHOD OF CONTROLLING BEHAVIORS OF PET ROBOTS

(75) Inventors: Masahiro Fujita, Saitama (JP); Hideki Noma, Kanagawa (JP); Makoto Inoue, Kanagawa (JP); Noritoshi Inoue, Tokyo (JP); Katsuya Muramatsu, Kanagawa (JP); Masashi Takeda, Tokyo (JP); Takao Yamaguchi, Kanagawa (JP); Kenichiro Ueki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/958,712

(22) PCT Filed: Feb. 14, 2001

(86) PCT No.: PCT/JP01/01037
§ 371 (c)(1),
(2), (4) Date: Oct. 11, 2001

(87) PCT Pub. No.: WO01/58649
PCT Pub. Date: Aug. 16, 2001

(65) Prior Publication Data
US 2002/0138175 A1 Sep. 26, 2002

(30) Foreign Application Priority Data
Feb. 14, 2000 (JP) ...................................... 2000-039809

(51) Int. Cl.[7] .............................................. G06F 19/00
(52) U.S. Cl. .................... 700/245; 700/94; 379/88.03; 446/141; 446/142; 446/268
(58) Field of Search ............... 700/245, 94; 329/88.03; 446/141, 142, 268

(56) References Cited

U.S. PATENT DOCUMENTS

| | | | |
|---|---|---|---|
| 4,657,104 A | * | 4/1987 | Holland ...................... 180/211 |
| 5,733,131 A | | 3/1998 | Park |
| 5,963,712 A | * | 10/1999 | Fujita et al. ............ 318/568.12 |
| 6,058,385 A | * | 5/2000 | Koza et al. .................... 706/13 |
| 6,275,773 B1 | * | 8/2001 | Lemelson et al. .......... 340/436 |
| 6,321,140 B1 | * | 11/2001 | Fujita et al. ................. 250/253 |

FOREIGN PATENT DOCUMENTS

| | | |
|---|---|---|
| CA | 2202353 | 4/1996 |
| JP | 5-329272 | 12/1993 |
| JP | 7-194851 | 8/1995 |
| JP | 11-58274 | 3/1999 |
| JP | 11-511859 | 10/1999 |
| JP | 2001-9169 | 1/2001 |
| WO | 96/04635 | 2/1996 |

OTHER PUBLICATIONS

Breazeal et al., Infant–like social interactions between a robot and a human caregiver, 1998, Internet, p. 1–p. 44.*
Hara et al., Real–time facial interaction between human and 3D face robot agen, 1996, IEEE, pp. 401–b.*

* cited by examiner

*Primary Examiner*—Yonel Beaulieu
*Assistant Examiner*—McDieunel Marc
(74) *Attorney, Agent, or Firm*—Frommer Lawrence & Haug LLP; William S. Frommer; Dennis M. Smid

(57) ABSTRACT

A robotic system, robot apparatus, and a control method are presented wherein behaviors suitable for a robot are embodied based on information distributed by a number of information distributing devices. Also, the robotic system, robot apparatus, and a control method are designed based on information distributed by the number of information distributing devices such that a robot is prohibited from embodying corresponding behaviors out of the behaviors the robot could embody, or that prohibition on the robot embodying corresponding behaviors is withdrawn. Furthermore, control data for the robot to generate behaviors can be modified to meet the desires of the robot and/or the user of the robot.

9 Claims, 21 Drawing Sheets

1 PET ROBOT (A) 122A

Q1: AGE
1. 0–10  2. 10–20  3. 30–40

Q2: SEX
1. MALE  2. FEMALE

Q3: OCCUPATION
1. STUDENT  2. COMPANY MEMBER  3. ONE'S OWN BUSINESS

Q4: FAMILY MAKEUP
1. SINGLE  2. MARRIED  3. CHILD 1

Q5: LANGUAGE USED
1. ENGLISH  2. JAPANESE  3. FRENCH

Q6: LIVING HOUR PATTERN
1. MORNING PATTERN (AM6:00–PM9:00)
2. DAY PATTERN (AM8:30–PM12:00)
3. NIGHT PATTERN (AM11:00–PM3:00)

...

(B) 122B

Q7: HOUSE
1. FLAT  2. COND  3. INDEPENDENT HOUSE

Q8: FLOOR SPACE
1. SMALLER-THAN-4-MAT ROOM  2. 6-MAT ROOM
3. LARGER-THAN-10-MAT ROOM

Q9: FLOOR MATERIAL
1. STRAW MAT  2. FLOORING  3. CARPETING

Q10: LIGHTING
1. FLUORESCENT  2. INCANDESCENT
3. INDIRECT LIGHTING

METHOD OF CONTROLLING BEHAVIORS OF PET ROBOTS

TECHNICAL FIELD

The present invention relates to robotic systems, robot apparatuses, and control methods for them as well as information processing units and methods, and is suitably applicable, for example, to the control of embodiment behaviors of pet robots and robotic systems to customize the control data of pet robots.

BACKGROUND ART

Of late, four-footed walking pet robots have been recently developed and commercialized by the present patent applicant. Such pet robots have external appearances resembling those of dogs or cats kept as pets in ordinary homes and act autonomously responding to commands from users and surrounding circumstances.

The word "behavior(s)" is defined as one action or a set of series of plural actions, and used as that sense hereinafter in this document. Accordingly, the "behavior" may be an action only, or may consist of a series of plural actions.

It can be imagined that, if such robots could act responding to TELEVISION programs or TELEVISION commercials or a particular sound (e.g., could dance to the accompaniment of songs) as if acting under the influence of TELEVISION programs, TELEVISION commercials, or if they could embody such behaviors later never embodied up until that time, the fun of entertainment robots would be increased with their entertainingness enhanced at the same time.

Also, it can be thinkable that, if such a thing were realized, with use of the above function, it would be possible to let pet robots watching TELEVISION commercials perform the advertisements of related products, which may increase the effectiveness of such performances.

Furthermore, it could be imagined for example that, if control data such as control programs and control parameters regulating the actions and behaviors of such pet robots could be as freely customized as users are pleased in accordance with their living environment, or the behavior history of pet robots themselves, pet robots that match the circumstances and living environment of the users could be realized, increasing users' affection towards them, in turn enhancing the entertainingness of pet robots.

DISCLOSURE OF INVENTION

The present invention has been made considering the above points and putting forth the proposal on robotic systems, robot apparatuses and control methods for them as well as information processing units and methods for them, which may enhance the entertainingness of pet robots.

To solve the subject matter the present invention tries, in a robotic system, to let robots embody suitable behaviors based on information distributed by information distribution means. As a result, in this robotic system it is now possible to let a robot act responding to the information distributed by the information distribution means, thereby realizing a robotic system that may enhance the entertainingness of a robot.

Also, the present invention tries, in a robotic system, to prohibit a robot from embodying specific behaviors out of the behaviors the robot could do based on the information distributed by the information distribution means, or to withdraw prohibition on the robot embodying corresponding behaviors. As a result, in this robotic system it is now possible to control the robot's embodiment behaviors based on such information distributed by the information distribution means, thereby realizing a robotic system that may enhance the entertainingness of a robot.

Furthermore, the present invention has provided a robot apparatus with recognition means for recognizing given information to be distributed and control means for managing the behavior embodiment of the robot apparatus. And, the control means lets the robot apparatus embody behaviors corresponding to the information based on the result recognized by the recognition means. As a result, the robot apparatus can act responding to information distributed from the information distribution means, thereby realizing a robotic system that may enhance the entertainingness of a robot.

Furthermore, the present invention has provided a robot apparatus with recognition means for recognizing information to be distributed and control means for controlling the behavior embodiment of the robot apparatus. And, the control means prohibits the robot device from embodying specific behaviors out of the behaviors the robot apparatus could do based on the result recognized by the recognition means, or withdraws prohibition on the robot apparatus embodying the corresponding behaviors. As a result, with the robot apparatus it is possible to control embodiment behaviors based on such information distributed from the information distribution means, thereby realizing a robotic system that may enhance the entertainingness of a robot.

Furthermore, the present invention has provided the control method of the robot apparatus with a first step to distribute given information, and a second step to let the robot apparatus embody suitable behaviors based on the corresponding information. As a result, with the control method of the robot apparatus it is possible to let the robot apparatus act responding to information distributed from the information distribution means, thereby realizing the control method of a robot apparatus that may enhance the entertainingness of the robot device.

Furthermore, the present invention has provided the control method of the robot apparatus with a first step to distribute given information, and a second step to prohibit the robot apparatus from embodying suitable behaviors out of the behaviors the robot apparatus could do, or to withdraw prohibition on the robot apparatus embodying suitable behaviors based on the corresponding information. As a result, with the control method of the robot apparatus it is possible to let the robot apparatus control embodiment behaviors based on the information distributed from the information distribution means, thereby realizing the control method of a robot apparatus that may enhance the entertainingness of the robot device.

Furthermore, the present invention has provided the information processing unit with modifying means for modifying control data for a robot to generate behaviors as desired by the robot or its user, and transmit means for transmitting the control data modified by the modifying means to the robot. As a result, the information processing unit can modify the behaviors of the robot freely, thereby realizing an information processing device that may enhance the entertainingness of the robot.

Furthermore, the present invention has provided the information processing method with a first step to modify control data for the robot to generate behaviors as desired by the robot or its user, and a second step to transmit the control data modified by the modifying means to the robot. As a result, the information processing method can modify the behaviors of the robot freely, thereby realizing an information processing method that may enhance the entertainingness of the robot.

BRIEF DESCRIPTION OF DRAWINGS

FIG. 16 is a schematic diagram showing a GUI screen appearing on the display of a personal terminal.

BEST MODES FOR CARRYING OUT THE INVENTION

Figure 1:
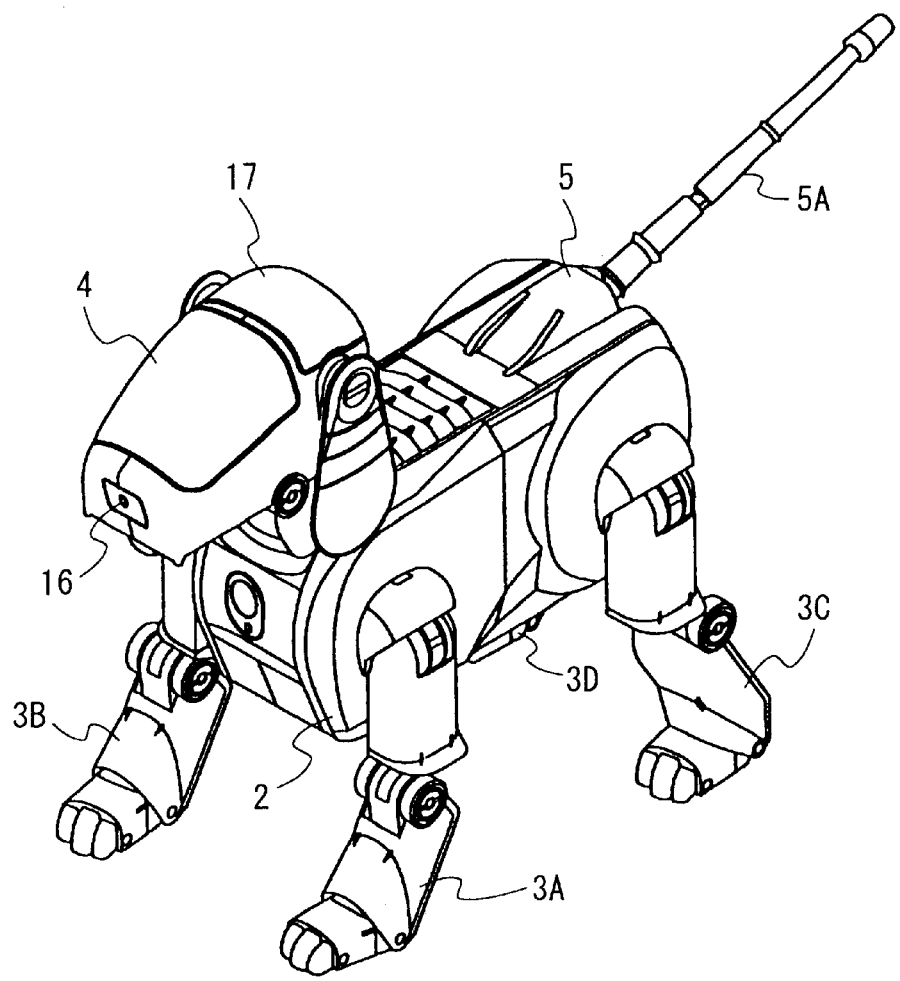
FIG. 1 is a perspective view showing the structure of a pet robot in the present embodiment.

Detailed description is given on the modes of carrying out the present invention, referring to the drawings.
(1) Construction of Pet Robot 1
(1—1) Outline of Construction of Pet Robot 1

In FIG. 1, the 1 shows a pet robot in whole of the present embodiment, which has external appearances on the whole resembling a dog or cat kept in an ordinary home. That is, the pet robot 1 has a body unit 2 connected with a leg unit 3A–3D linked at the front, rear, left and right, and a head unit 4 and tail unit 5 at the front and rear respectively.

Figure 2:
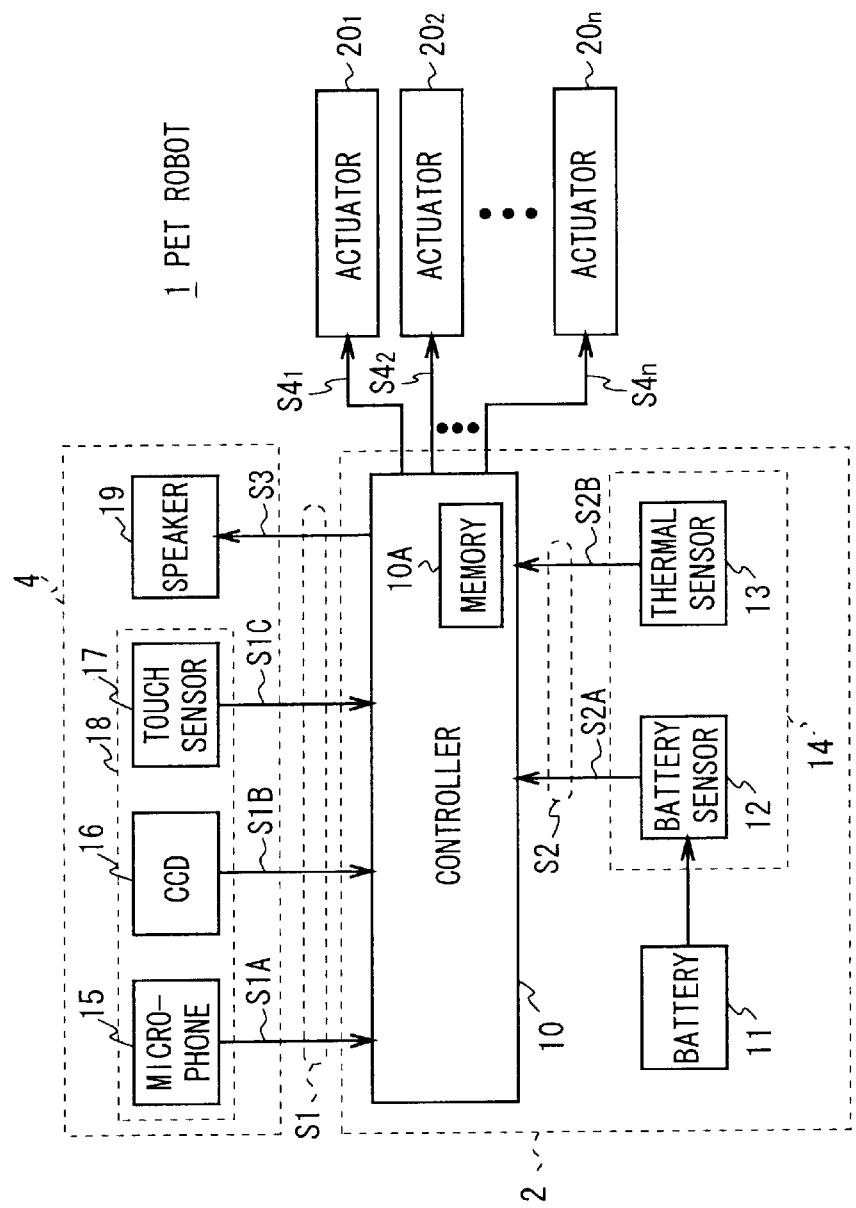
FIG. 2 is a block diagram showing the internal structure of a pet robot.

In this case the body unit 2 comprises, as shown in FIG. 2, a controller 10 controlling the overall operation of the pet robot 1, battery 11 as the power source for the pet robot 1, internal sensor 14 consisting of a battery sensor 12, and thermal sensor 13.

The head unit 4 comprises an external sensor 18 consisting a microphone 15 functioning as the 'ear' of the pet robot 1, CDD (Charge Coupled Device) camera 16 function as the eye, and touch sensor 17, and speaker 19 working as the 'mouth', each in place.

Furthermore, a number of actuators $20_1$–$20_n$ agreeing with the degree of freedom, are placed at the joint of each leg unit 3A–3D, at the linkage point of each leg unit 3A–3D and the body unit 2, at the linkage point of the head unit 4 and body unit 2 as well as at the root point of the tail 5A of the tail unit 5.

The microphone 15 of the external sensor unit 18 collects command sounds given by a user in terms of a scale through a sound commander, (not shown in figure), such as "Walk", "Lie down", or "Chase the ball", a resultant voice signal S1A of which is fed to the controller 10. The CCD camera 16 takes a picture of the surroundings, an image signal S1B obtained from which is sent to the controller 10.

The touch sensor 17, located at the upper part of the head unit 4 as is apparent from FIG. 1, detects a pressure received, which is created as a result of a physical influence such as "stroke" or "pat" exerted by the user, and the detected result is fed to the controller 10 as a pressure detection signal S1C.

The battery sensor 12 of the internal sensor unit 14 detects the residual energy of the battery 11, of which result is sent to the controller 10 as the battery residue detection signal S2A. The thermal sensor 13 detects a temperature inside the pet robot 1 whose result is sent to the controller 10 as the temperature detection signal S2B.

The controller 10 judges an external and internal states and the existence of a command and influence from the user based on the voice signal S1A given from the external sensor 18, image sensor SIB and pressure detection signal S1C, etc., (these are put together and called "external information signal S1" hereinafter), and the battery residue detection signal S2A and temperature detection signal S2B, etc. (these are put together and called "internal information signal S2" hereinafter) supplied by the internal sensor unit 14.

Then, the controller 10 determines the next behavior based on the foregoing judgment result, and control data consisting of a control program and various control parameters stored in advance in the memory 10, and drives necessary actuators $20_1$–$20_n$ by feeding a drive signal $S4_1$–$S4_n$ to them based on the result obtained so as to let the pet robot 1 perform behaviors and motions such as swinging the head unit 4 up and down, left and right, wagging the tail 5A of the tail unit 5 and walking by driving the leg unit 3A–3D.

At the same time, the controller 10 generates an audio signal S3 as occasion calls, which is fed to the speaker 19 to output a voice outside based on the audio signal S3 and blinks an unshown LED (Light Emitting Diode) in a given pattern placed at the position where the eyes of the pet robot 1 are supposed to be.

In this way the pet robot 1 is designed to be capable of acting autonomously responding to a state inside and outside of it and commands from and influence by the user.

(1-2) Processing of the Controller 10

Explanation is given on the processing of the controller 10 regarding the behavior generation of such a pet robot 1.

Figure 3:
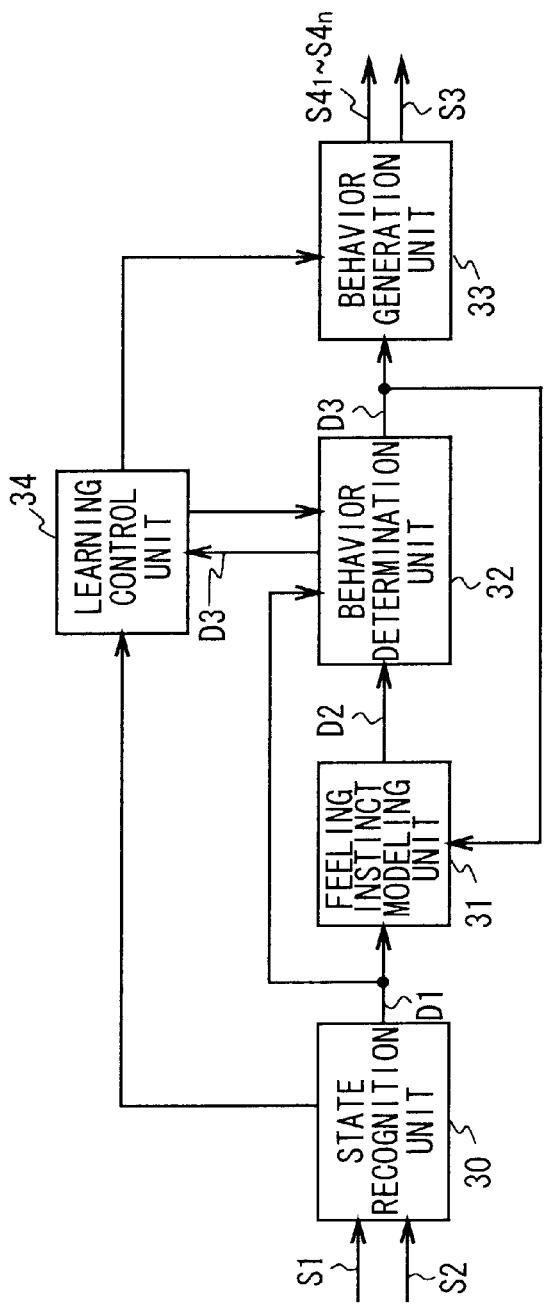
FIG. 3 is a block diagram used in explaining processing on behavior generation of a controller.

The processing content of the controller 10 regarding the behavior generation of the pet robot 1 is functionally divided as follows, as shown in FIG. 3:

state recognition unit 30 for recognizing a state feeling/instinct modeling unit 31 for determining the state of feeling/instinct based on the results recognized by the state recognition unit 30 behavior determination unit 32 for determining the subsequent behavior based on the result recognized by the state recognition unit 30 and the state of feeling/instinct held in the feeling/instinct modeling unit 31 behavior generation unit 33 to let the pet robot 1 actually embody behaviors based on the results determined by the behavior determination unit 32, and learning control unit 34 to control learning to be described later.

In this case, the state recognition unit 30 inputs an external information signal S1 supplied from the external sensor 18 and an internal information signal S2 from the internal sensor 14, and recognizes a specific external state and internal state, such as "patted", "stroked", "detected a ball", "battery residue low", and "internal temperature high" based on these input signals, the results of which are output at the feeling/instinct modeling unit 31 and the behavior determination unit 32 as recognition information D1.

The feeling/instinct modeling unit 31 determines the state of the feeling/instinct of the pet robot 1 based on the recognition information D1 supplied from the state recognition unit 30 and determined behavior information D3 supplied from the behavior determination unit 32 to be described later.

In other words the feeling/instinct modeling unit 31 comprises a feeling model holding a total of six (6) parameters, each indicating the intensity of each feeling of "joy", "grief", "surprise", "fear", "dislike", and "anger", and an instinct model holding a total of four (4) parameters, each indicating the intensity of each desire for "appetite", "affection", "curiosity", and "moving".

And, the feeling/instinct modeling unit 31 renews the value of parameters of the corresponding information and desires of a feeling model and an instinct model periodically based on recognition information D1 given from the state recognition unit 30 and determined behavior information D3 given from the behavior determination unit 32. Also, when the parameter of any emotion or desire exceeds the preset value, a result of the renewal processing, the feeling/instinct modeling unit 31 outputs that value to the behavior determination unit 32 as the feeling/instinct modeling information D2.

The behavior determination unit 32 determines a subsequent behavior based on the recognition information D1 given from the state recognition unit 30, feeling/instinct information D2 given from the feeling/instinct modeling unit 31, and a behavior model as a control parameter stored in a memory 10A (FIG. 2) in advance, the result of which is output at the feeling/instinct modeling unit 31 and behavior generation unit 33 as the determined behavior information D3.

Figure 4:
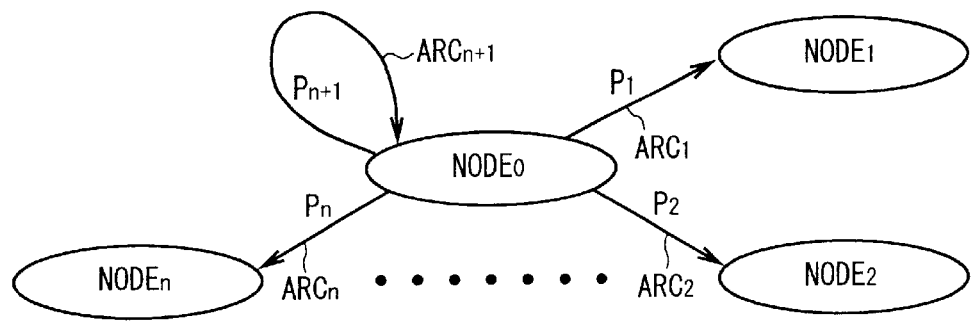
FIG. 4 is a conceptual diagram used in explaining probability automaton.

In the case of this embodiment, the behavior determination unit 32 uses an algorithm called 'probability automaton', as a means for determining the next behavior or motion, in determining with probability, to which node $NODE_o\text{-}NODE_n$ a particular node (state) $NODE_o\text{-}NODE_n$ as shown in FIG. 4, should transit including itself based on the transition probability $P_1\text{-}P_{n+1}$, each set to an arc $ARC_1\text{-}ARC_{n+1}$ connecting each node $NODE_o\text{-}NODE_n$.

That is, the memory 10A stores a table of data describing a condition to transit to another node $NODE_o\text{-}NODE_n$ for each node $NODE_o\text{-}NODE_n$ as a behavior model, a transition address and transition probability for each condition. (This table is called "state transition table" hereinafter.)

And, when recognition information D1 is given from the state recognition unit 30, or when feeling/instinct information D2 is given from the feeling/instinct modeling unit 31, the behavior determination unit 32 determines a subsequent behavior with a probability using the state transition table of a node $NODE_o\text{-}NODE_n$ when stored in the memory 10A, the result of which is transferred to the feeling/instinct modeling unit 31 and behavior generation unit 33 as the determined behavior information D3.

The behavior generation unit 33 stores inside the memory 10A motion data, control parameters for each behavior to let pet robot 1 perform various behaviors, sound data, control parameters for each voice sound to let the pet robot 1 output various voice sounds, and behavior data, control parameters for each behavior to let the pet robot 1 perform various behaviors composed of a series of set of behaviors.

When determined behavior information D3 is given from the behavior determination unit 32, the behavior generation unit 33 retrieves corresponding motion data, sound data, or behavior data from the memory 10A, based on which a drive signal $S4_1\text{-}S4_n$ is fed to necessary actuators $20_1\text{-}20_n$ to drive them (FIG. 2), or generates a sound signal S3 fed to a speaker 19 (FIG. 2), or lets an LED located at the height of the eyes blink. In this way the behavior generation unit 33 lets the pet robot 1 perform behaviors determined by the behavior determination unit 32.

On the other hand, upon recognizing actions such as "stroked" or "patted" based on a pressure detection signal S1C (FIG. 2) out of the external signals S1 fed from a touch sensor 17 (FIG. 2), the state recognition unit 30 informs the learning control unit 34 of it.

At this time the learning control unit 34 retains the present and past behaviors of the pet robot 1 based on the determined behavior information D3 given from the behavior determination unit 32. Then, when the recognition result "stroked" is given from the state recognition unit 30 as the recognition information D1 while the pet robot 1 is embodying behaviors, the learning control unit 34 notifies the behavior determination unit 32 of it.

Based on the above notification, the behavior determination unit 32 decreases by a given amount a transition probability $P_1\text{-}P_{n+1}$ in the state transition table of a node $NODE_1\text{-}NODE_n$ corresponding to a behavior model stored in the memory 10A (an equivalent to a node $NODE_1\text{-}NODE_n$ before transition to the then node $NODE_1\text{-}NODE_n$) corresponding to a behavior being embodied, while increases each of the other corresponding transition probabilities $P_1\text{-}P_{n+1}$ in the state transition table by as much amount as decreased.

On the contrary, when a recognition result "patted" is given from the state recognition unit 30 as the recognition information D1 while the pet robot 1 is embodying behaviors, the learning control unit 34 notifies the behavior determination unit 32 of it.

Thus, based on the above notification, the behavior determination unit 32 increases by a given amount a transition probability $P_1\text{-}P_{n+1}$ in the state transition table of a node $NODE_1\text{-}NODE_n$ (an equivalent to a node $NODE_1\text{-}NODE_n$ before transition to the then node $NODE_1\text{-}NODE_n$) corresponding to a behavior model stored in the memory 10A corresponding to a behavior being embodied, while decreases each of the other corresponding transition probabilities $P_1$–$P_{n+1}$ in the state transition table by as much amount as increased.

According to the controlling described above, when the pet robot 1 is patted, a transition probability $P_1$–$P_{n+1}$ corresponding to that behavior decreases, making it harder for the pet robot 1 to embody it, and when the pet robot 1 is stroked, a transition probability $P_1$–$P_{n+1}$ corresponding to that behavior increases, making it easier for the pet robot 1 to embody it, thus the behavior patterns of the pet robot 1 can be varied as if the pet robot 1 varied its own behavior patterns like a living animal in accordance with the training by the owner.

In this way the controller 10 is designed to let the pet robot 1 act autonomously changing (or learning) its behavior patterns responding to actions exerted by the user.

(2) Structure of Robotic System 40 of Present Embodiment (2-1) Structure of Robotic System 40

Figure 5:
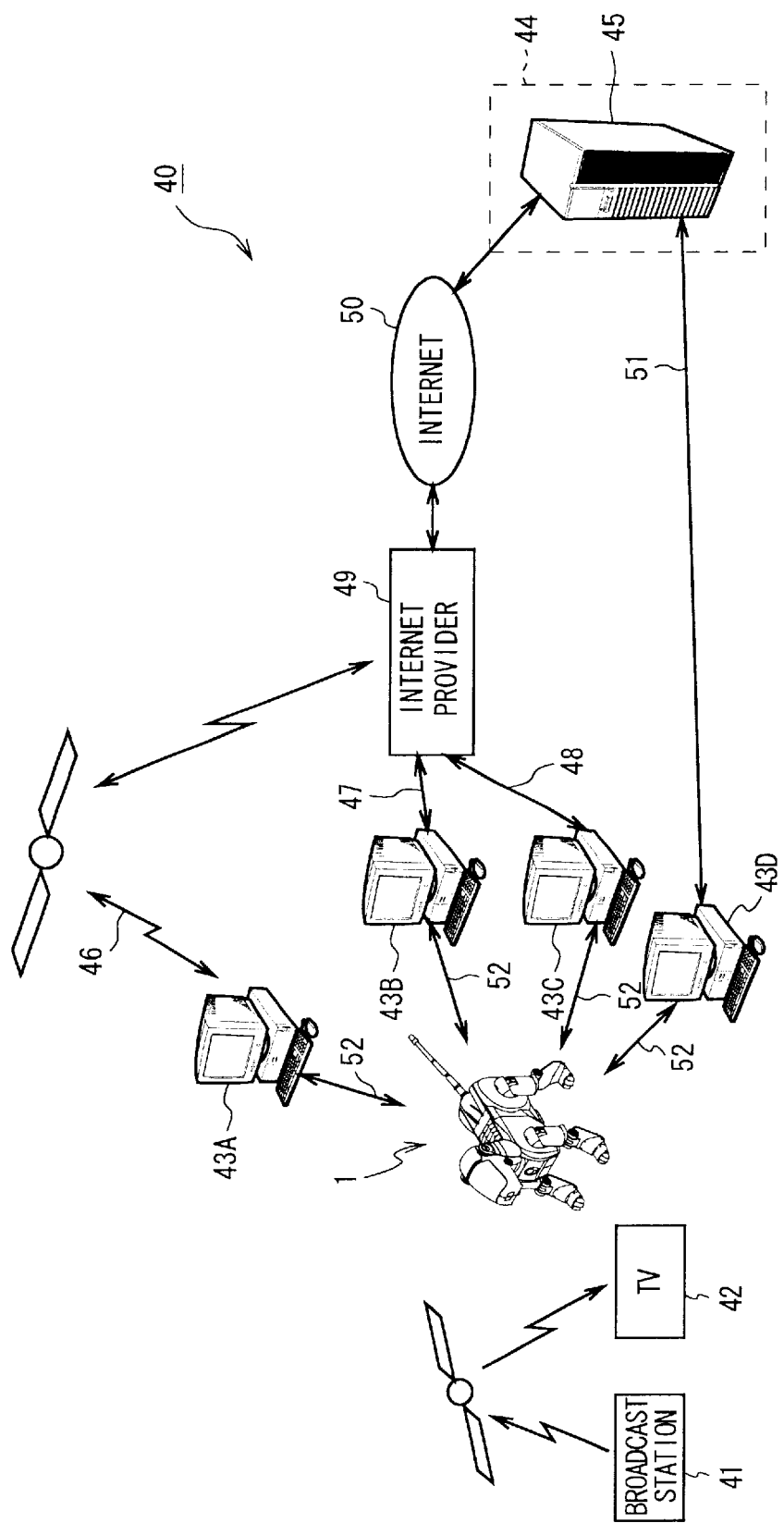
FIG. 5 is a block diagram showing a robotic system in the present mode of embodiment.

The FIG. 5 shows a robotic system 40 that may provide such services as; an embodiment behavior control service (to be described later) to control embodiment behaviors of the pet robot 1 utilizing telecast, a behavior generation control service to provide behavior generation control data needed for the pet robot 1 to embody new behaviors, and a customization service to customize (or modify) control data for the pet robot 1 based on the individual information and living environment of a user, or the behavior history and other elements of the pet robot 1.

The robotic system 40 as described above, consists of unshown broad cast equipment installed at a broadcast station 41, the pet robot 1, a television receiver 42 located at the user's home of the pet robot 1, user's personal terminal 43A to 43D made up of user-owned personal computers, and a server 45 installed by a service company 44.

In this case, personal terminals 43A to 43C are connected to an Internet provider 49 via a satellite communication line 46, a cable television line 47 or telephone line 48, and to the server 45 through an Internet provider and the Internet 50 in order. Also, the personal terminal 43D is connected direct to the server 45 through the general public line 51 of the public telephone line and others. And, these personal terminals 43A to 43D are set up to be capable of transmitting/receiving necessary data to/from the server 45 via the Internet 50 or the general public line 51.

Furthermore, each of the personal terminals 43A–43D can be electrically connected to the pet robot 1 by means of the cable 52, and is capable of relaying communication between the server 45 and the controller 10 (FIG. 2) of the pet robot 1.

On the other hand, the server 45 is a WWW (World Wide Web) server, with which the service company 44 performs various processes when offering the aforementioned embodiment behavior control service, behavior generation control data providing service, and customization service, etc. The Internet 50 transfers screen data of a variety of GUI (Graphic User Interface, to be described later) screens and other necessary image data to the personal terminals 43A–43D accessing the server 45 via the Internet 50 or the general public line 51. And, the GUI screens and images based on the screen data and image data are displayed on the display units of an appropriate personal terminal 43A to 43D.

Figure 7:
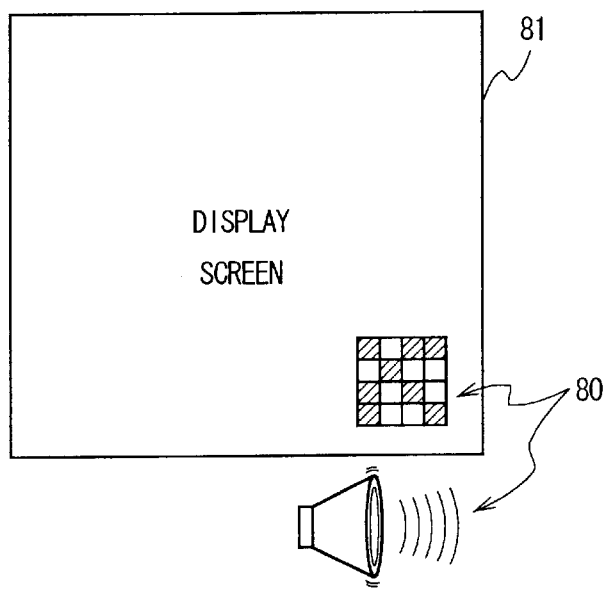
FIG. 7 is a schematic diagram used in explaining special codes.

The outline of the structure of the server 45 is shown in FIG. 7. As is apparent from FIG. 7, the server 45 consists of a LAN (Local Area Network) card 60 incorporating an interface circuit for the Internet 50, modem 61 as an interface circuit for the general public line 51, CPU 62 supervising the control of the whole server 45, memory 63 as a working memory of the CPU 62, hard disk drive 64 to record a variety of programs and data for various processes (to be described later) the server 45 performs, and other necessary data.

In this case, the CPU 62 captures into itself, by means of the LAN card 60 or modem 61, data and commands supplied from the personal terminals 43A to 43D accessing the server 45 via the Internet 50 or the general public line 51, and performs given processes based on the data and command captured, and programs stored on the hard disk drive 64.

Also, the CPU 62 transfers the screen data of various data such as GUI screens (to be described later), other data, programs and commands, etc., to an appropriate personal terminal 43A to 43D based on the results of the above processes via the LAN card 60 or modem 61.

(2—2) Embodiment Behavior Control Service

Next, description is given on the embodiment behavior control service, behavior generation control data providing service, and customization service offered by this robotic system 40.

The embodiment behavior control service is explained first. A special code 80 composed of two-dimensional bar codes in black/white or in color or a specific scale command such as "do mi so do mi so do mi so", for example, as shown in FIG. 8 by way of example, is telecast in the robotic system 40, upon watching or hearing which the pet robot 1 is to perform a behavior corresponding to the special code telecast on the spot.

Figure 8:
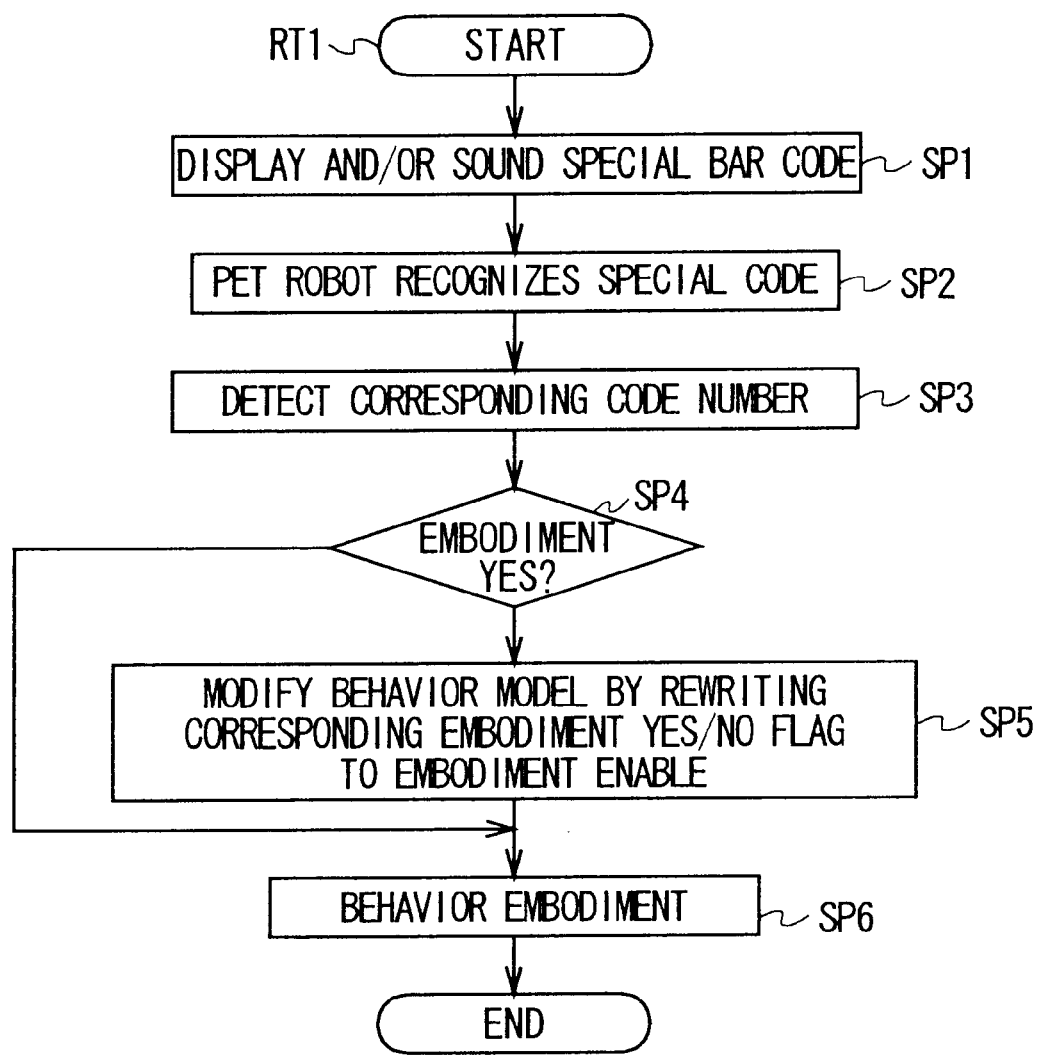
FIG. 8 is a flowchart showing the embodiment behavior control procedure.

That is to say, when offering such a service in the robotic system 40, first a broadcast station 41 (FIG. 5) broadcasts the image data and/or voice data of a special code 80 in given form multiplexed with the image data of television programs or television commercials following the embodiment behavior control procedure RT1 shown in FIG. 8, then the special code 80 as shown in FIG. 7 is displayed at one corner of the display screen 81 of the television receiver 42 or the sound of the scale command is let out from the television receiver 42 (Step SP1).

On the other hand, upon detecting the special code 80 by means of the CCD camera 16 (FIG. 2) based on an image signal S1B (FIG. 2) and/or a voice signal S1A from the microphone 15, the controller 10 (FIG. 2) of the pet robot 1 recognizes the shape of the special code 80 (Step SP2), and detects the code number corresponding to the form and/or the scale command based on the recognized result (Step SP3).

In other words, in the case of the robotic system 40, each shape or scale command of plural kinds of special codes 80 is stored in the memory 10A of the pet robot 1 in advance in the form of database (this database is called "specially-coded database" hereinafter) oriented to each of individual code numbers (these numbers are called "intrinsic code numbers" hereinafter).

Figure 9:
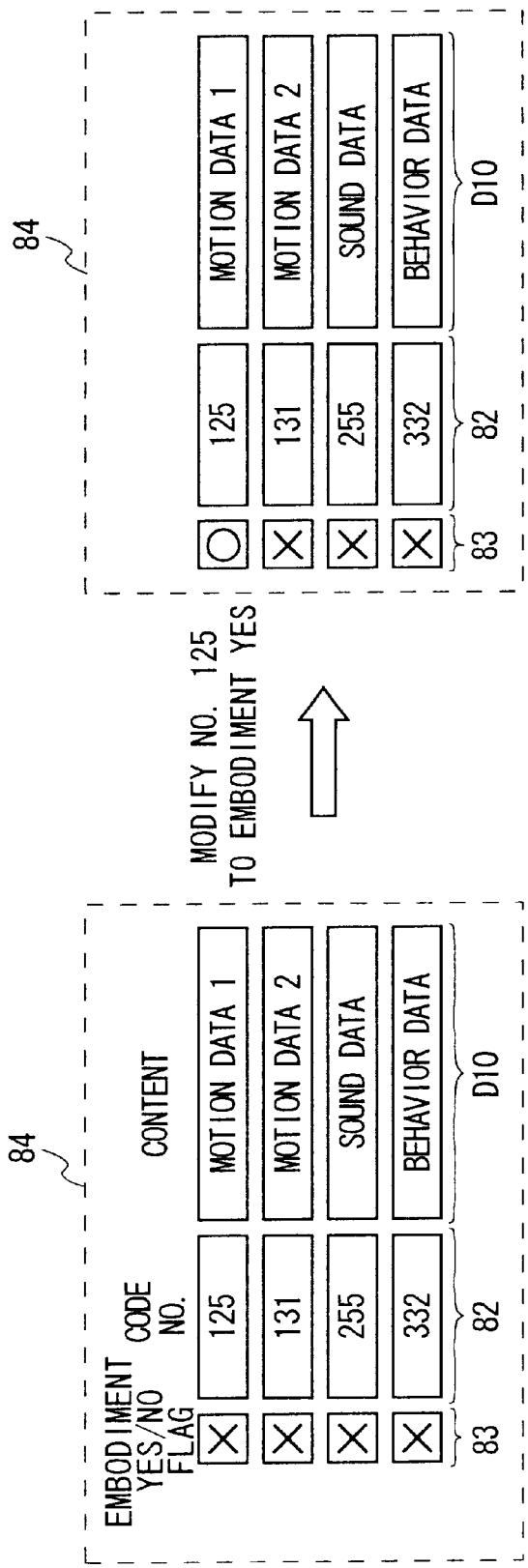
FIG. 9 is a conceptual diagram used in explaining content database.

Also, control data for behavior generation explained in the section of the behavior generation unit 33 in FIG. 3, namely, each motion data, each sound data, and each behavior data (it is called "behavior generation control data D10" for convenience sake hereinafter), is stored in the memory 10A in the form of database (this database is called "content data base 84" hereinafter) oriented to an embodiment yes/no flag 83 indicating whether or not each different special code 82 and its behavior may be embodied as shown in FIG. 9.

For additional information, with regard to a behavior corresponding to behavior generation control data D10 with the embodiment yes/no flag 83 being in the embodiment "No" state, a transition probability $P_1$–$P_{n+1}$ (FIG. 4) for its behavior in that behavior model is set to "0" in advance and, the embodiment yes/no flag 83 to the embodiment "No" state, a transition probability $P_1$–$P_{+1}$ can not be assigned even with the above "learning", resulting in prohibition of an embodiment.

On the other hand, upon detecting a special code 80 displayed on the television receiver 42 (FIG. 5) based on the image signal S1B (FIG. 2) given from the CCD camera 16 (FIG. 2) or the voice signal S1A given from the microphone 15, the controller 10 of the pet robot 1 recognizes the shape or musical scale of the special code 80 and detects the code number (intrinsic code number 82) of the special code (Step SP3) by retrieving the specially-coded database based on the recognized result.

Also, the controller 10 detects an embodiment yes/no flag 83 oriented to the intrinsic code number 82 by retrieving the content database 84 based the detected result, and judges whether an embodiment yes/no flag 83 is in the embodiment "Yes" state (the embodiment yes/no flag 83 is raised) (Step SP4).

In the case of the embodiment yes/no flag 83 in the embodiment "Yes" state, the controller 10 reads out the corresponding behavior generation control data D10 from the content database 84, driving necessary actuators $20_1$ to $20_n$ (FIG. 2) based on the behavior generation control data D10, creating an audio signal S3 (FIG. 2), which is transferred to the speaker 19 (FIG. 2), or letting the LED located at the height of the eyes emit light (Step SP6).

Thus, in the robotic system 40 the pet robot 1 is designed to be capable of embodying corresponding behaviors based on the special codes 80 displayed on or sounded from the television receiver 42.

On the other hand, in the case of the embodiment yes/no flag 83 being in the "NO" state at the step SP4, the controller 10 of the pet robot 1 changes the embodiment yes/no flag 83 to the embodiment "Yes" state (the embodiment yes/no flag 83 is raised).

At the same time the controller 10 changes the transition probability $P_1$–$P_{n+1}$ corresponding to the behavior in the behavior model from "0" [%] to a preset value, and concurrently lowers by a given amount the other corresponding transition probabilities $P_1$–$P_{n+1}$.

Furthermore, the controller 10 reads out proper behavior generation control data D10 from the content database 84, based on which necessary actuators $20_1$ to $20_n$ (FIG. 2) are set in motion, an audio signal S3 (FIG. 2) is created, which is transferred to the speaker 19 (FIG. 2), or the LED located at the height of the eyes is let to emit light (Step SP6).

Thus, the pet robot 1 is made to be able to embody those behaviors in future.

In this way, in the robotic system 40, behaviors so far prohibited from being embodied can be embodied based on the special code 80 displayed on or sounded from the television receiver 42, while the pet robot 1 is designed to be able to embody those behaviors as it likes afterwards.

(2-3) Behavior Generation Control Data Providing Service

Figure 10:
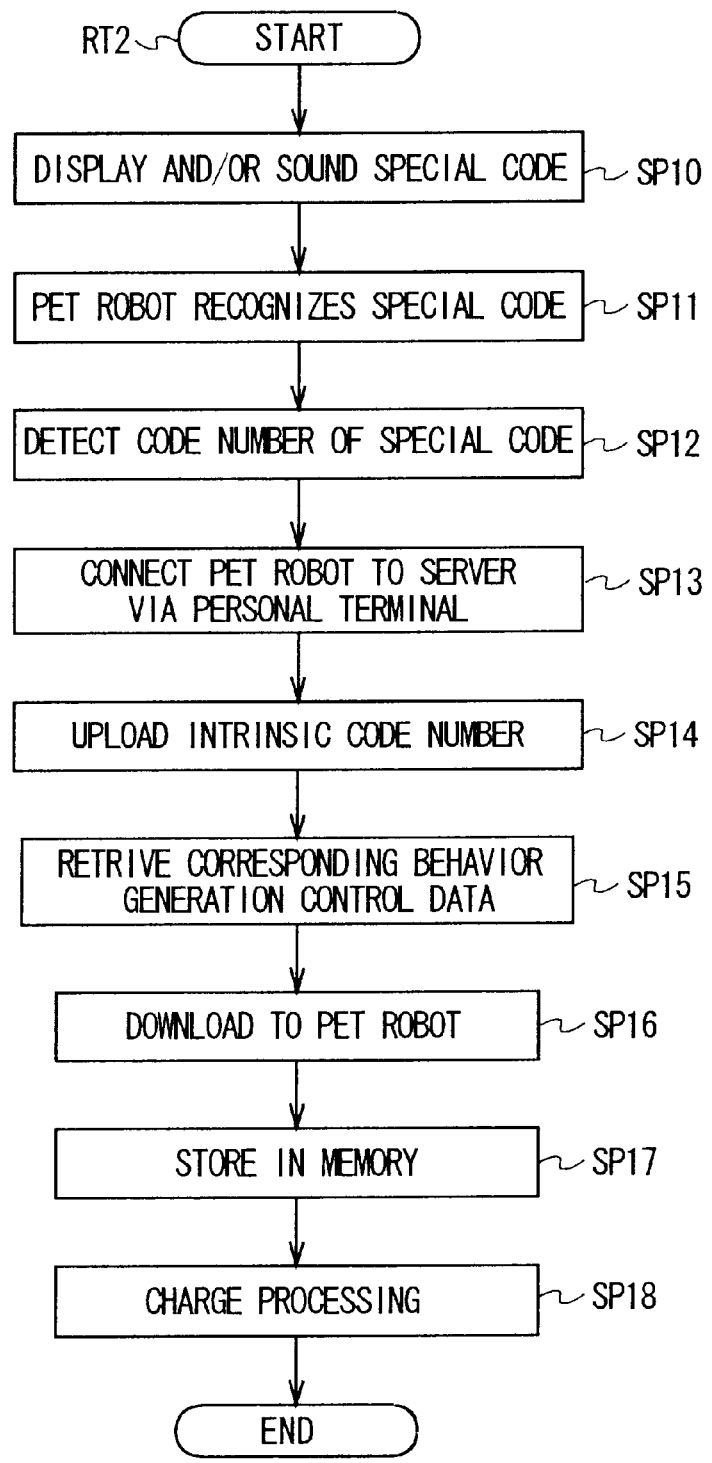
FIG. 10 is a flowchart showing data downloading procedure.

On the other hand, in the robotic system 40, if the pet robot 1 does not have inside the memory 10A behavior generation control data D10 to create suitable behaviors, as when letting the pet robot 1 perform newly generated behaviors for example, it is possible to download behavior generation control data 10 into the pet robot 1 according to a user's desire, following the download processing procedure RT2 shown in FIG. 10.

In practice, in the robotic system 40, when providing the behavior generation control data D10 for new behavior for example to users, a special code 80 composed of two-dimensional bar codes and the scale command oriented to that behavior is displayed on and/or sounded from the display screen 81 of the television receiver 42 in the same way as in the step SP1 of the aforementioned embodiment behavior control procedure RT1 (FIG. 7).

In this case, this special code 80 is a spare special code not oriented to any of behavior generation control data D10 stored in the memory 10A of the pet robot 1 at the initial time.

As a result, upon detecting a special code 80 displayed on or sounded from the television receiver 42 based on the image signal S1B (FIG. 2) coming from the CCD camera 16 (FIG. 2) or the voice signal S1A from the microphone 15, the controller 10 of the pet robot 1, recognizes (Step SP11) the shape of the special code 80 and retrieves the intrinsic code number 82 of the special code 80 based on the recognized result and the preceding special code database.

At this time, each shape of such plural kinds of spare special codes 80 not corresponding to any of the behavior generation control data stored in the memory 10A at the initial stage is stored in the special code database, oriented to each of the intrinsic code numbers 82 respectively.

As described above, when a special code 80 is displayed on the display screen 81 of the television receiver 42 and/or sounded from the television receiver 42, the intrinsic code number 82 of the special code 80 is detected (Step SP12) by such a retrieving processing. Then, this intrinsic code number 82 is stored into a given area of the memory 10A (this is called "intrinsic code number storage area" hereinafter) under the control of the controller 10.

Meantime, when a user wishes to download the behavior generation control data D10 of new behaviors into his/her own pet robot 1, with the pet robot 1 connected to a personal terminal 43A–43D with use of a cable 52 (FIG. 5), the personal terminal 43A–43D is connected to the server 45 (Step SP13).

Figure 11:
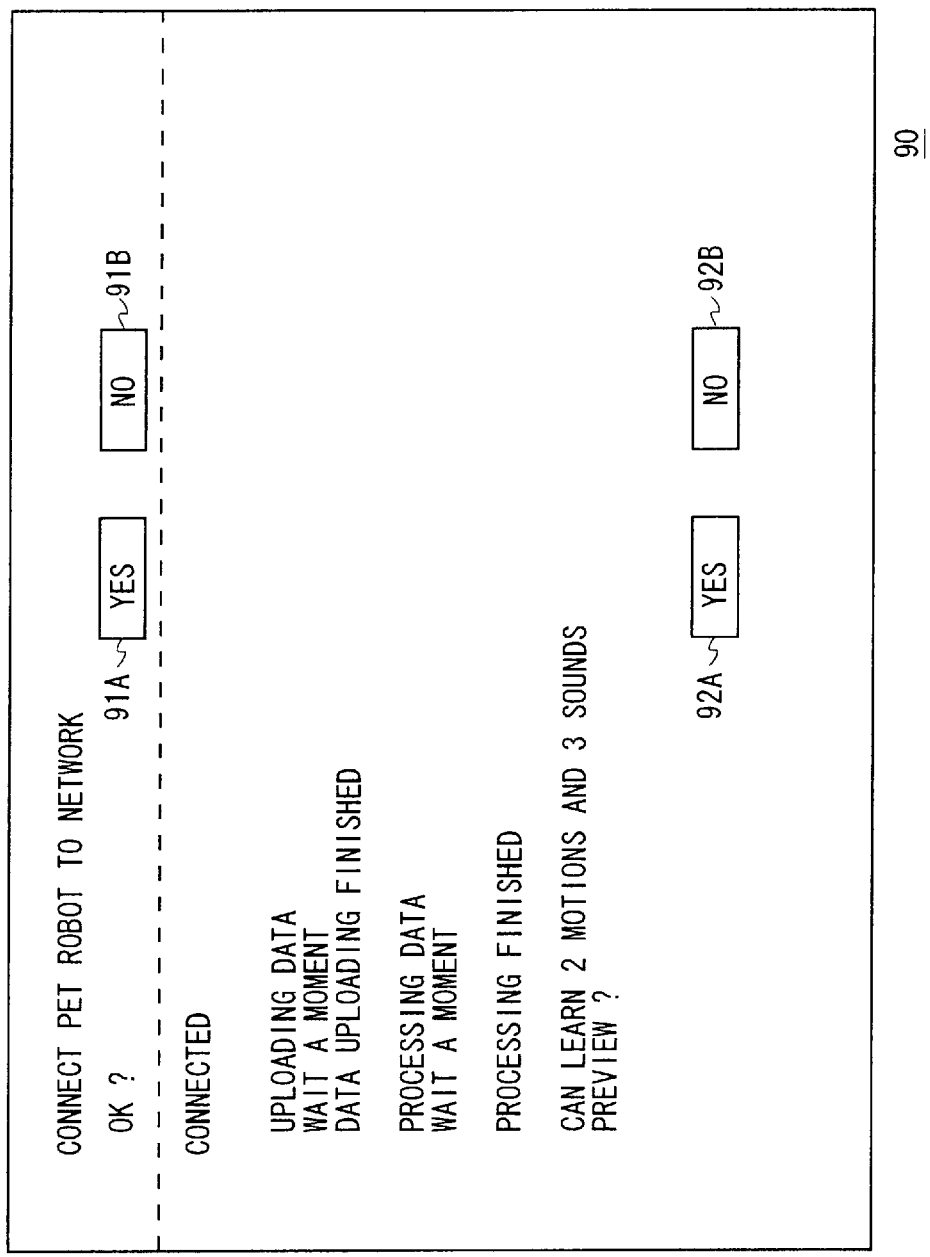
FIG. 11 is a schematic diagram showing a GUI screen appearing on the display of a personal terminal.
Figure 12:
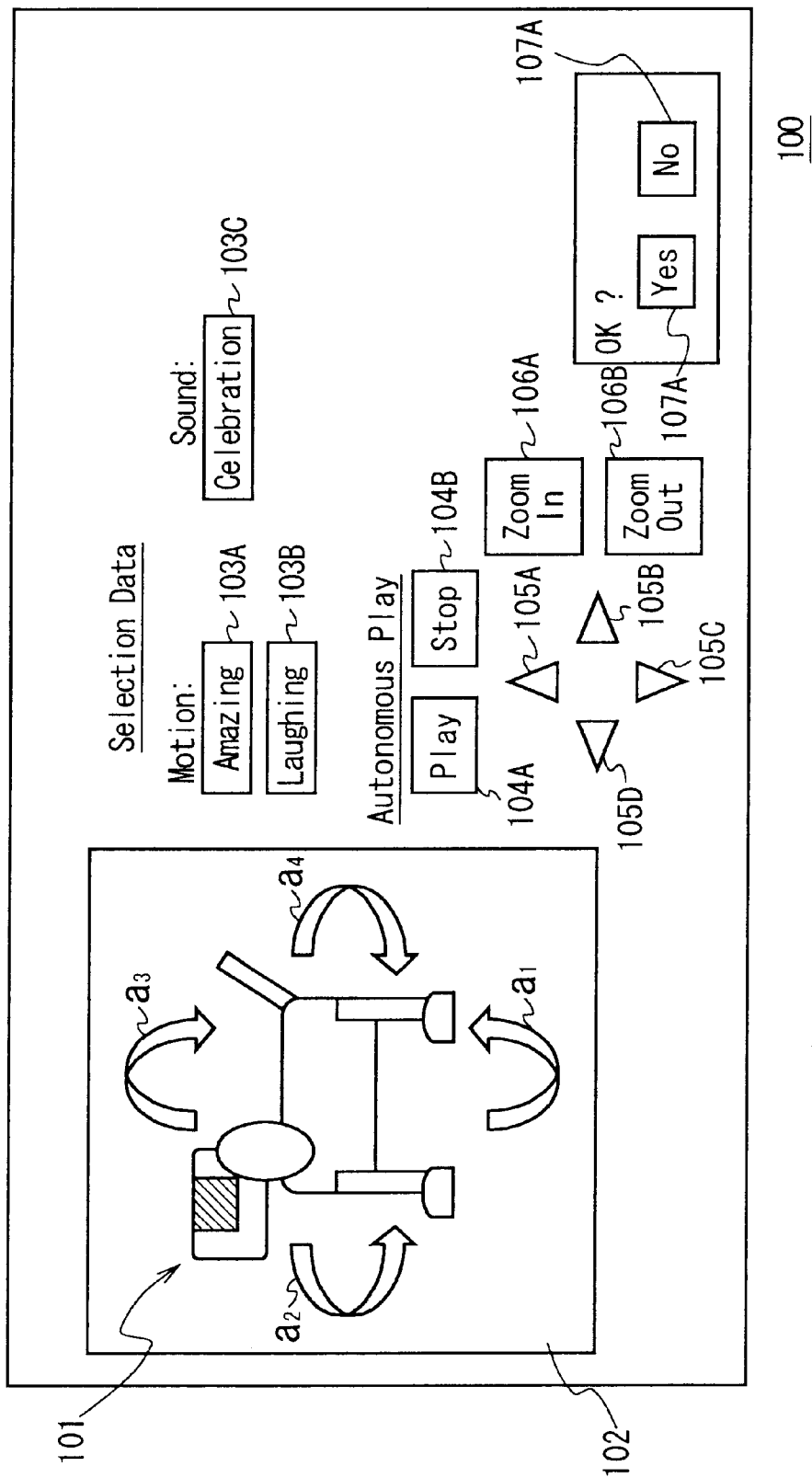
FIG. 12 is a schematic diagram showing a GUI screen appearing on the display of a personal terminal.

At this time a GUI screen 90 as shown in FIG. 11, is displayed on the display of the personal terminal 43A–43D. In this case, a message "Connect pet robot to network. OK?" is displayed on the GUI screen 90 at the initial stage, together with "Yes" 91A and "No" 91B buttons.

The click of the "Yes" button 91A by the user in this state uploads into the server 45 an intrinsic code number stored in the intrinsic code number storage area of the memory 10A of the pet robot 1 under the control of the CPU 62 (FIG. 6) of the server 45 (Step SP14).

Upon obtaining an intrinsic code number 82 from the pet robot 1 in this matter, the CPU 62 of the server 45 diagnoses what behavior could be retained based on the intrinsic code number 82 obtained. A behavior to be retained means a new behavior oriented to the intrinsic code number 82 read out from the memory 10A of the pet robot 1.

When the CPU 62 finishes this diagnosis processing, the CPU 62 displays on the GUI screen 90 a message "Processing finished. Ready to store two (2) movements and three (3) sounds. Preview wanted?" based on the diagnosis processing as well as "Yes" button 92A and "No" button 92B.

And, when the user clicks the "No" button 92B, the processing on this behavior generation control data providing service is finished. On the other hand, if the user clicks the "Yes" button 92A, a GUI screen 100 as shown in FIG. 11, is shown on the display of the personal terminal 43A–43D.

Here, the GUI screen 100 being a simulation screen to confirm what kinds of behaviors ("movements" or "sound") they are in actuality the pet robot 1 can memorize at this time, the three-dimensional image 101 of the pet robot 1 is displayed on the preview portion 102 at the left-hand side of the screen.

Also, buttons 103A to 103C with the description of the names of behaviors the pet robot 1 can memorize, are displayed on the right-hand side of the preview portion 102 on the GUI screen 100 as well as a play button 104A and stop button 104B below it.

And, on the GUI screen 100, when the user clicks the play button 104A after clicking a desired button 103A–103C, the corresponding behavior is performed in a three-dimensional image 101, or the corresponding sound can be output from the speaker of the personal terminal 43A–43D. The movement of the three-dimensional image 101 and the voice output from the personal terminal 43A–43D can be terminated by clicking the stop button 104B.

Furthermore, the clicking of a first to fourth rotary button 105A–105D displayed on the low, right portion on the GUI screen 100 will turn the three-dimensional image 101 in the corresponding direction (arrows $a_1$ to $a_4$). Also, the three-dimensional image 101 can be displayed, enlarged or reduced in turn by depressing a zoom-in button 106A or zoom-out button 106B displayed on the right-hand side of the first to fourth rotary buttons 105A–105D.

In this way a user judges whether to let the pet robot 1 learn the corresponding behavior based on a movement of the three-dimensional image 101 displayed on the GUI screen 100 and audio sound output from the speaker of the personal terminal 43A–43D. The "No" button 107B located at the low, right corner, should be depressed in order not to let the pet robot 1 learn it. As a result, in this case the processing on the behavior generation control data providing service is terminated.

Figure 13:
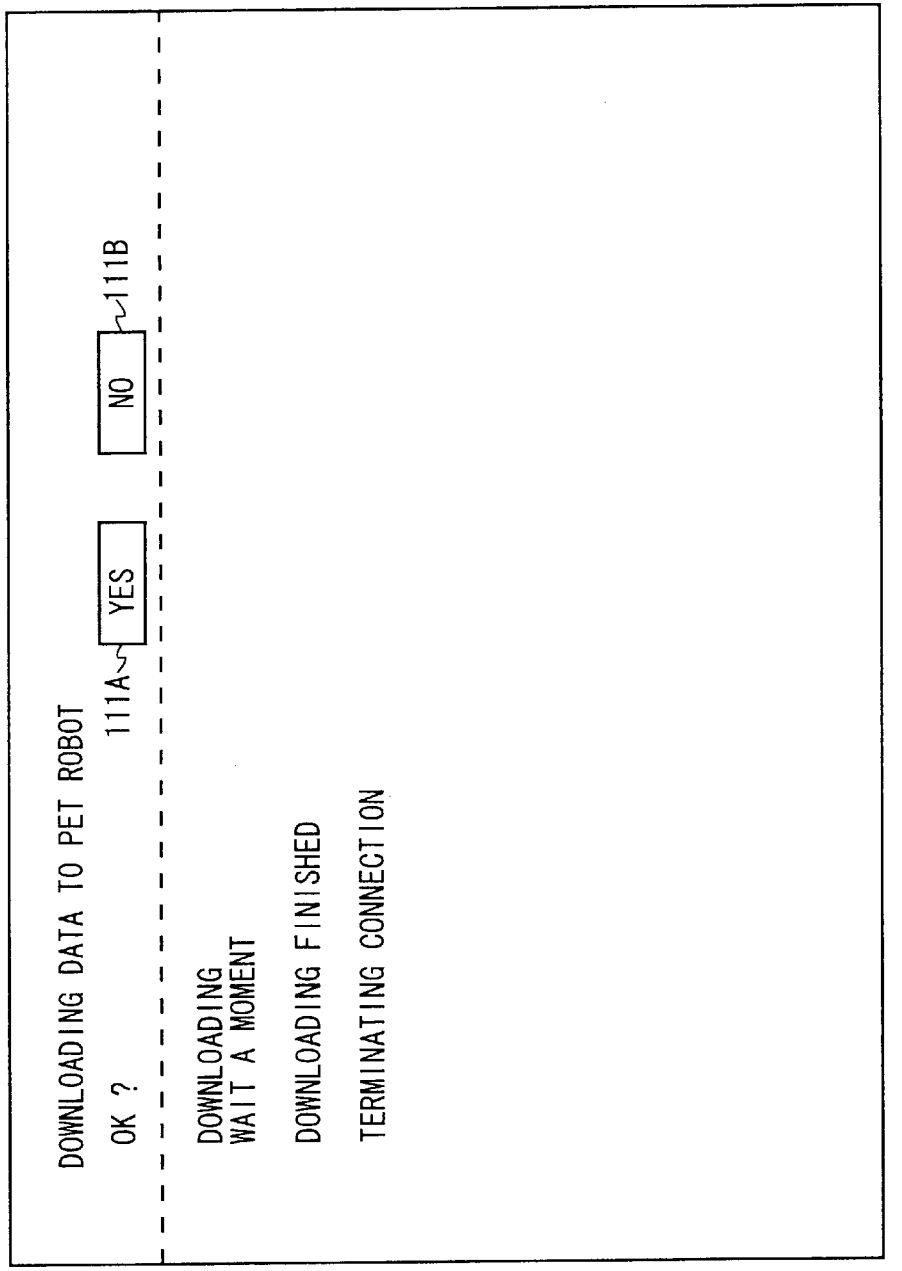
FIG. 13 is a schematic diagram showing a GUI screen appearing on the display of a personal terminal.
Figure 14:
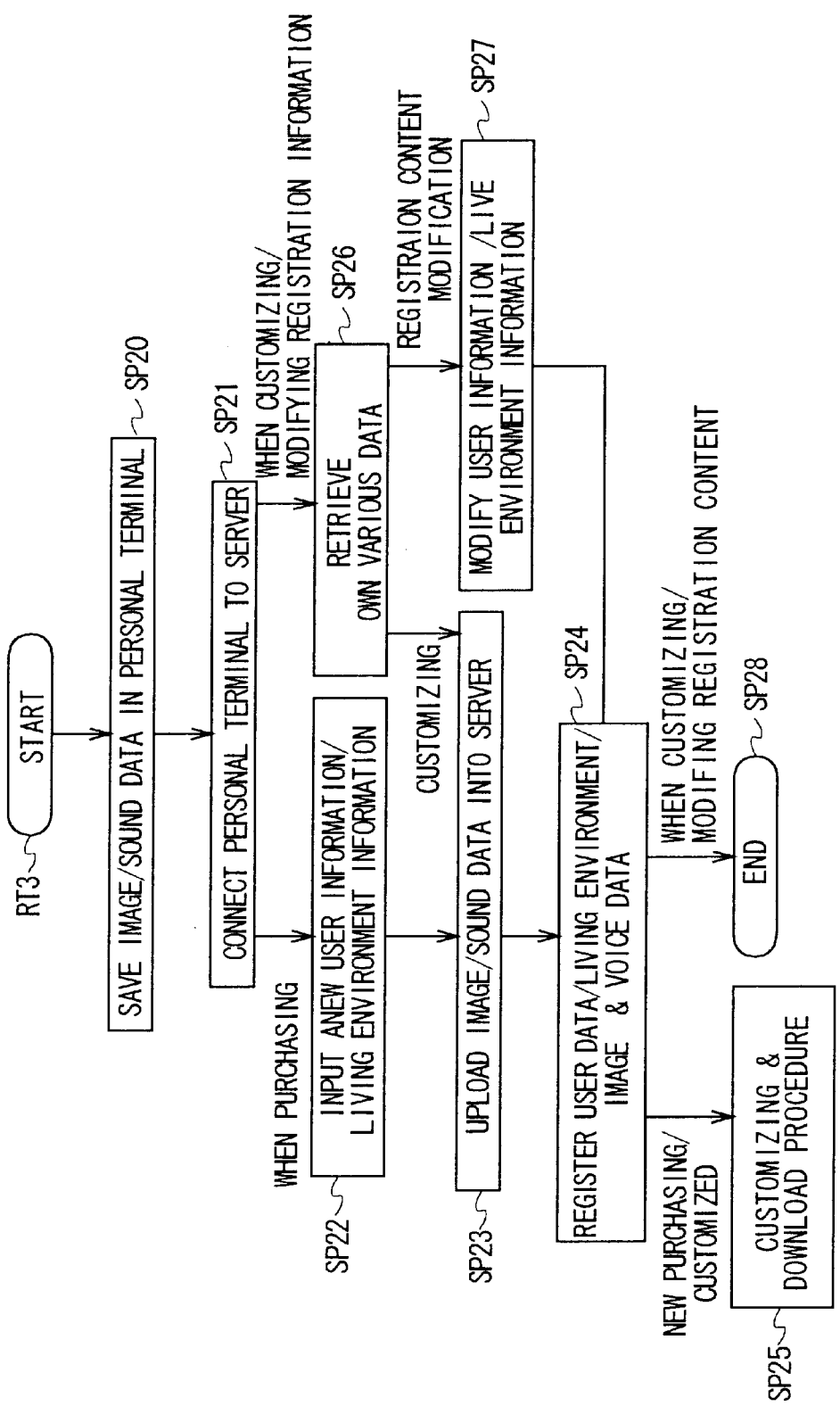
FIG. 14 is a flowchart showing purchasing, customizing, registration content modification procedure.

On the other hand, the "Yes" button 107A located at the low, right corner should be clicked to let the pet robot 1 learn a behavior. Then, in this case the GUI screen 110 as shown in FIG. 13 appears on the display of a personal terminal 43A to 43D.

Displayed on the GUI screen 110 at the initial stage is a message "Data to be downloaded into pet robot. OK?" as well as a "Yes" button 111A and "No" button 111B. The clicking of the "No" button 111B at this time terminates processing on the behavior generation control data providing service.

On the contrary, if the "Yes" button is clicked, the retrieving and downloading of the corresponding behavior generation control data 10 is performed under the control of the CPU 62 of the server 45.

That is to say, the CPU 62 seeks out a behavior generation control data 10 of a behavior the pet robot 1 can memorize out of a variety of behavior generation control data 10, (including new one), stored in a hard disk drive 64 (Step SP15) in advance. Then, the CPU lets the pet robot 1 download this behavior generation control data 10 (Step SP16).

Upon obtaining behavior generation control data D10 in this way, the controller 10 of the pet robot 1 registers this behavior generation control data 10, oriented to an intrinsic code number 82, into the content database 84 (FIG. 9), and sets to the embodiment "Yes" state an embodiment yes/no flag 83 corresponding to an intrinsic code number 82 in the content data base 84 (Step SP17).

The finish of such downloading terminates the connection between the server 45 and the personal terminal 43A–43D, and then charge processing is performed to sponsoring businesses and users in accordance with the kind of behavior generation control data D10 downloaded into the pet robot 1 (Step SP18).

In this way, in a robotic system 40, behavior generation control data 10 or control data to generate new behaviors is offered to users, and it is so designed that the pet robot 1 can embody new behaviors based on the behavior generation control data 10.

(2-4) Customization Service

Next, the customization service is explained. In this robotic system 40 a user can purchase the control data of the pet robot 1 customized according to his/her own circumstances (age, sex, occupation, and languages, etc.) and living environment (space of rooms, floor materials, etc.), or can have such control data customized, after its purchase, according to his/her circumstances and living environment, or have the control data of the pet robot 1 customized according to the behavior history of the pet robot 1.

That is, in this robotic system 40 a user wishing to have such a customization service is to save into his/her personal terminal 43A–43D the image data of his/her own face obtained with use of the video camera or others, and the voice data of his/her own voice obtained by the tape recorder and others (Step SP20) following a purchasing/customizing/registration content modification procedure, and then a personal terminal 43A–43D is to be connected to the server 45 (Step SP21).

Such image data and voice data is data to be used when the pet robot 1 recognizes the image and voice of the user, and is incorporated into the control data as part of the data when customizing the control data of the pet robot 1, which is described later.

Figure 15:
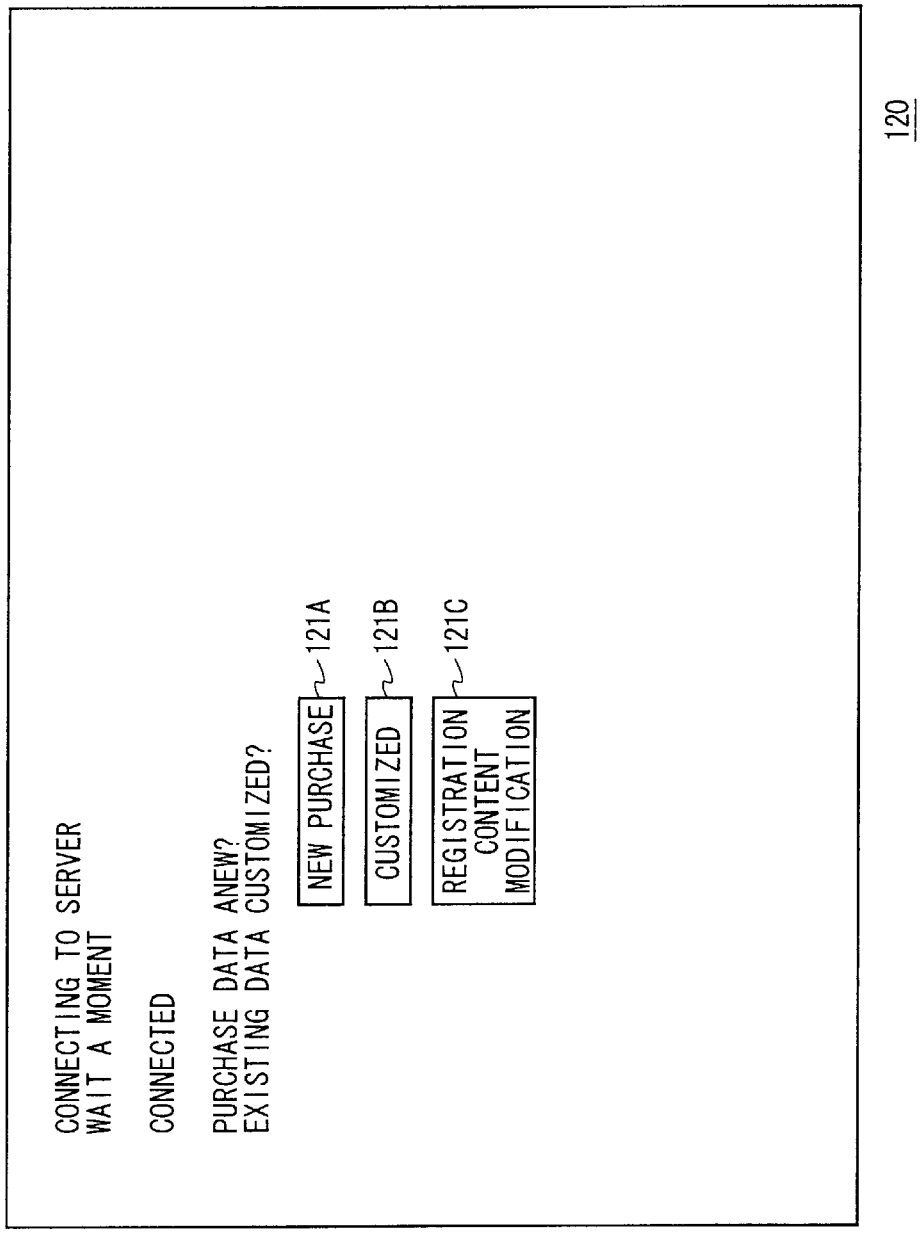
FIG. 15 is a schematic diagram showing a GUI screen appearing on the display of a personal terminal.

At this time, a GUI screen 120 as shown in FIG. 15 appears on the display of the personal terminal 43A–43D. Then, the user makes a multiple choice using the GUI screen 120: to purchase the control data of the pet robot 1 anew, or to have the existing control data of the pet robot 1 customized, or to have pre-registered information (user information and living environment information) modified.

And, when purchasing the control data of the pet robot 1 anew, the user only has to click the first button 121A, then GUI screens similar to 122A (A) and 122B (B) in FIG. 16, appear on the display of the personal terminal 43A–43D.

Thus, the user can enter his/her own information selectively in order using the GUI screens 122A and 122B, on age, sex, occupation, family makeup, language used, and living time schedule, etc., (they are put together, and called "user information" hereinafter), and information on room environment, room area, floor material, and lighting mode, etc. (they are put together, and called "living environment information" hereinafter)(Step SP22).

Figure 17:
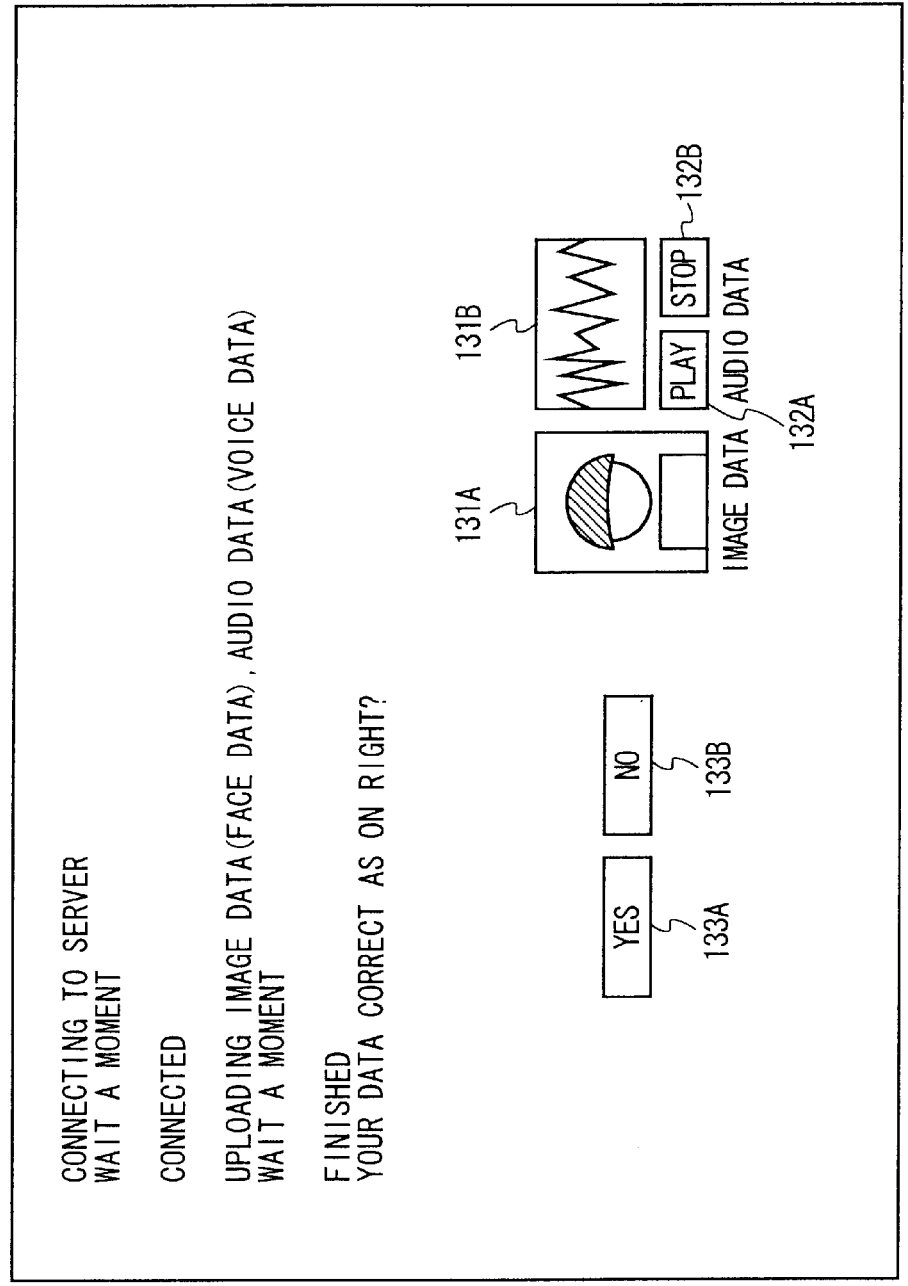
FIG. 17 is a schematic diagram showing a GUI screen appearing on the display of a personal terminal.

When all the user information and living environment information needed for registration is entered by the user answering all the questions, a GUI screen 130 as shown in FIG. 17 appears on the display of the personal terminal 43A–43D.

The image data of the user's face and audio data of the user's voice saved in the personal terminal 43A–43D is uploaded at this time under the control of the CPU 62 of the server 45 (Step SP23), with the image of the user's face based on the image data and the waveforms of the user's voice based on the audio data displayed on the face display portion 131A and voice waveform display portion 131B of the GUI screen within the GUI screen 130 respectively.

On the GUI screen 130 the audio sound (user's voice) based on the sound data uploaded into the server 45 can be output by means of the speaker of the personal terminal 43A–43D by clicking a play button 132A displayed beneath the audio waveform display portion 131B, which also can be stopped by clicking a stop button 132B.

Thus, upon confirming that the face displayed on the face display portion 131A of the GUI screen 130 and the voice output through the speaker of the personal terminal 43A–43D, are of his own, the user is to click a "Yes" button 133A at the lower part of the screen, if everything is OK.

As a result, the user information and living environment information entered with the use of the GUI screens 122A and 122B shown in FIGS. 16(A) and (B), and the image data of the user's face and audio data of the user's voice uploaded into the server 45, are stored on the hard disk drive 64 in the form of database under the control of the CPU 62 of the server 45 (Step SP24).

The control data of the pet robot 1 based on the registered user information, living environment information, image data and audio data is customized following the customizing and downloading procedure RT5 shown in FIG. 20, and sold (Step SP25) to the user, which is described later.

On the other hand, if a user wants to have a service to have the present control data of the pet robot 1 customized on the GUI screen 120 in FIG. 15, the second button 121B should be clicked.

Consequently a given GUI screen (not shown in figure) appears on the display of the personal terminal 43A–43D. Then, after entering his/her own ID using the GUI screen (Step SP26), a user is to select a desired customization service.

Thus, similarly to the above, the image data of the user's face and audio data of the user's voice saved in the personal terminal 43A–43D is uploaded (Step SP23), with the GUI screen 130 shown in FIG. 17 appearing on the display of the personal terminal 43A–43D. When the user clicks the "Yes" button 133A on the GUI screen 130 later, the image data and audio data is stored on the hard disk drive 64 in the form of database, along with pre-registered user's information and living environment information (Step SP24).

Afterwards, the control data of the user's pet robot 1 is customized following the customizing and downloading procedure RT5 shown in FIG. 20 based on the registered image data, audio data, user information, and living environment information (Step SP25), which is described later.

On the contrary, in the case of having the pre-registered user's information and living environment information modified on the GUI screen 120 in FIG. 15, the third button 121C is to be clicked.

Consequently, an unshown GUI screen appears on the display of the personal terminal 43A–43D to enter the user's ID. Then, the user is to select a registered content modification after entering his/her user ID using the GUI screen (Step SP26).

Then, the registered user information and living environment information on the user appears on the display of the personal terminal 43A–43D. After modifying items the user wants changed out of the user information and living environment displayed (Step SP27), the user is to click the finish button.

Thus, similarly to the above, the image data of the user's face and audio data of the user's voice saved in the personal terminal 43A–43D is uploaded (Step SP23), with the GUI screen 130 shown in FIG. 17 appearing on the display of the personal terminal 43A–43D. When the user clicks the "Yes" button 133A on the GUI screen 130 later, the image data and audio data is stored on the hard disk drive 64 in the form of database, along with pre-registered user's information and living environment information (Step SP24). And then, the processing of the server 45 terminates (Step SP28).

Next, description is given on the procedure to register the data of the behavior history of the pet robot 1 retained inside the pet robot 1 into the server 45.

In this robotic system 1 the daily average number of steps a pet robot takes, and the data of behavior history indicating the history of behaviors of the pet robot 1, such as the accumulated numbers of being "patted" and "stroked" by the user, are saved in the memory 10A. Such behavior history data is renewed in order according to the behaviors of the pet robot 1.

In addition to the above behavior history data, a variety of data regarding the pet robot 1, including the serial number and manufacture data of the pet robot 1, is stored in the memory 10A of the pet robot 1. Data such as the serial number and manufacture data of the pet robot 1 and behavior history data is put together, and called "personal data" hereinafter.

Figure 18:
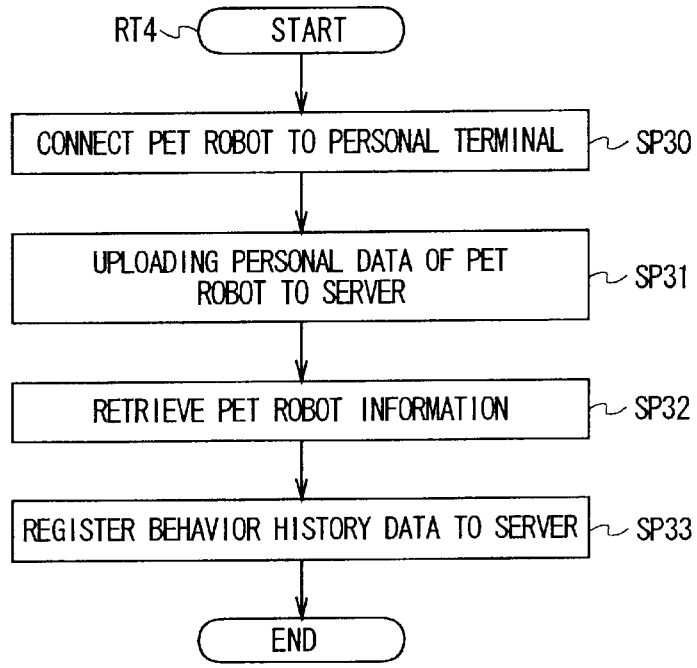
FIG. 18 is a flowchart showing behavior history data registration procedure.

A user wishing to have the behavior history data of the pet robot 1 registered into the server 45 is to first connect the pet robot 1 to the server 45 through a personal terminal 43A–43D following the behavior history data registration procedure RT4 shown in FIG. 18 (Step SP30).

Figure 19:
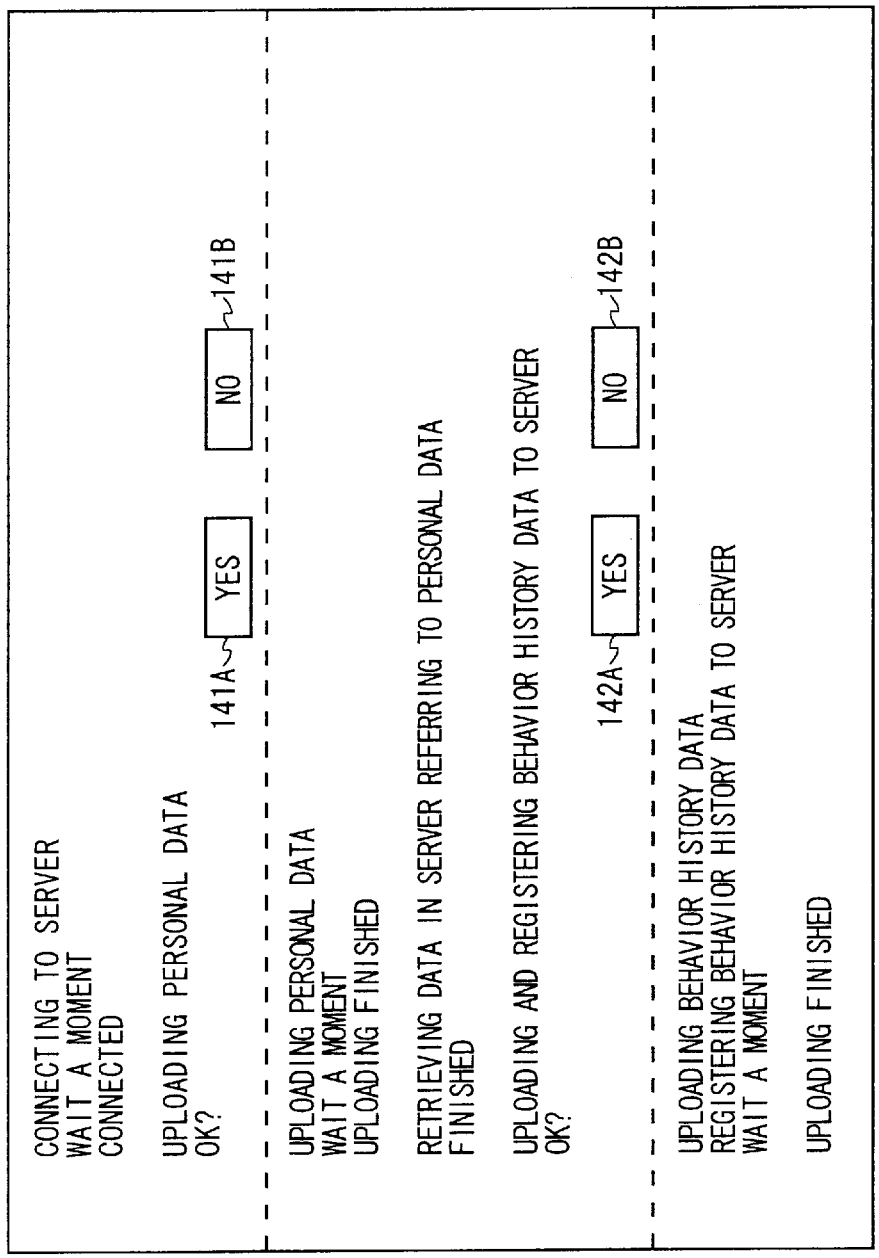
FIG. 19 is a schematic diagram showing a GUI screen appearing on the display of a personal terminal.

A GUI screen 140 similar to the one shown in FIG. 19 appears on the display of the personal terminal 43A–43D at this time. A message "Uploading personal computer. OK?" is displayed on the GUI screen 140 at the initial stage, along with a "Yes" button 141 and "No" button 141B.

With the "Yes" button 141A clicked out of the "Yes" button 141A and "No" button 141B by the user, personal data retained in the memory 10A of the pet robot 1 can be uploaded into the server 45 (Step SP31).

Detailed information such as the personal data of each of the registered pet robots 1 (this is called "pet robot information database" hereinafter) is stored on the hard disk drive 64 of the server 45 in the form of database at this time. Thus, upon uploading the personal data of the pet robot 1, the CPU 62 of the server 45 retrieves the owner (or user) of the pet robot 1 based on the personal data and pet robot information database (Step SP32).

Furthermore, a message "Behavior history data uploaded and registered on the server. OK?" is subsequently displayed on the GUI screen 140 (FIG. 19), together with a "Yes" button 142A and "No" button 142B. Accordingly, when registering the behavior history data of the pet robot 1 into the server 45, the user is to click the "Yes" button 142A out of the "Yes" button 142A and "No" button 142B.

As a result, the behavior history data of the pet robot 1 uploaded as described above is stored, under the control of the CPU 62 of the server 45, on the hard disk drive 64 in the form of database, oriented to the image data of the user's face, audio data of the user's voice, user information and living environment information (Step SP33).

Explanation is given on the procedure to customize and download into the pet robot 1 the control data of the pet robot 1 based on the image data of the user's face, audio data of the user's voice, user information, living environment information, and the behavior history data of the pet robot 1, registered as described above.

Figure 20:
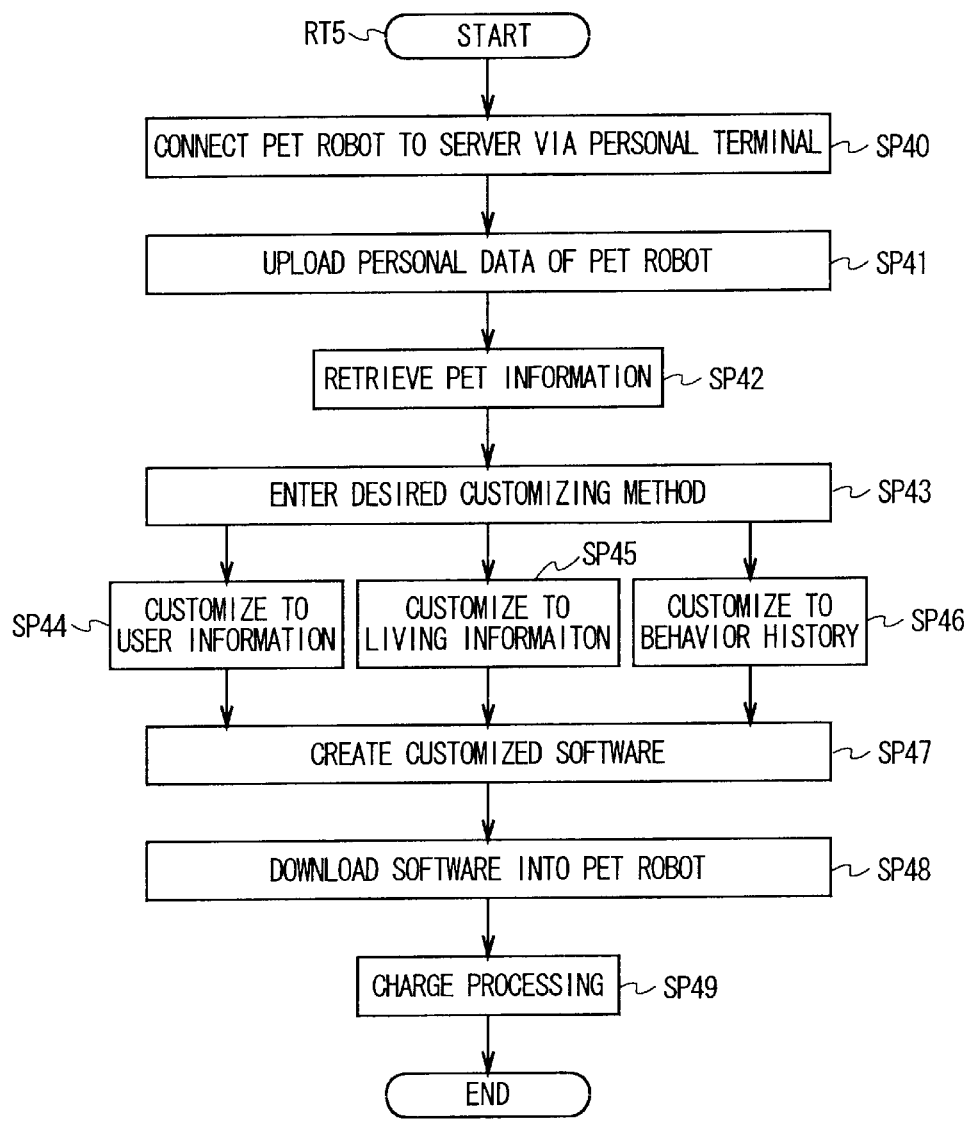
FIG. 20 is a flowchart showing customizing and downloading procedure.

A user wishing to utilize such a service is to first connect his/her pet robot 1 to the server 45 through a personal terminal 43A–43D (Step SP40) following the customizing and downloading procedure RT5 shown in FIG. 20.

Figure 21:
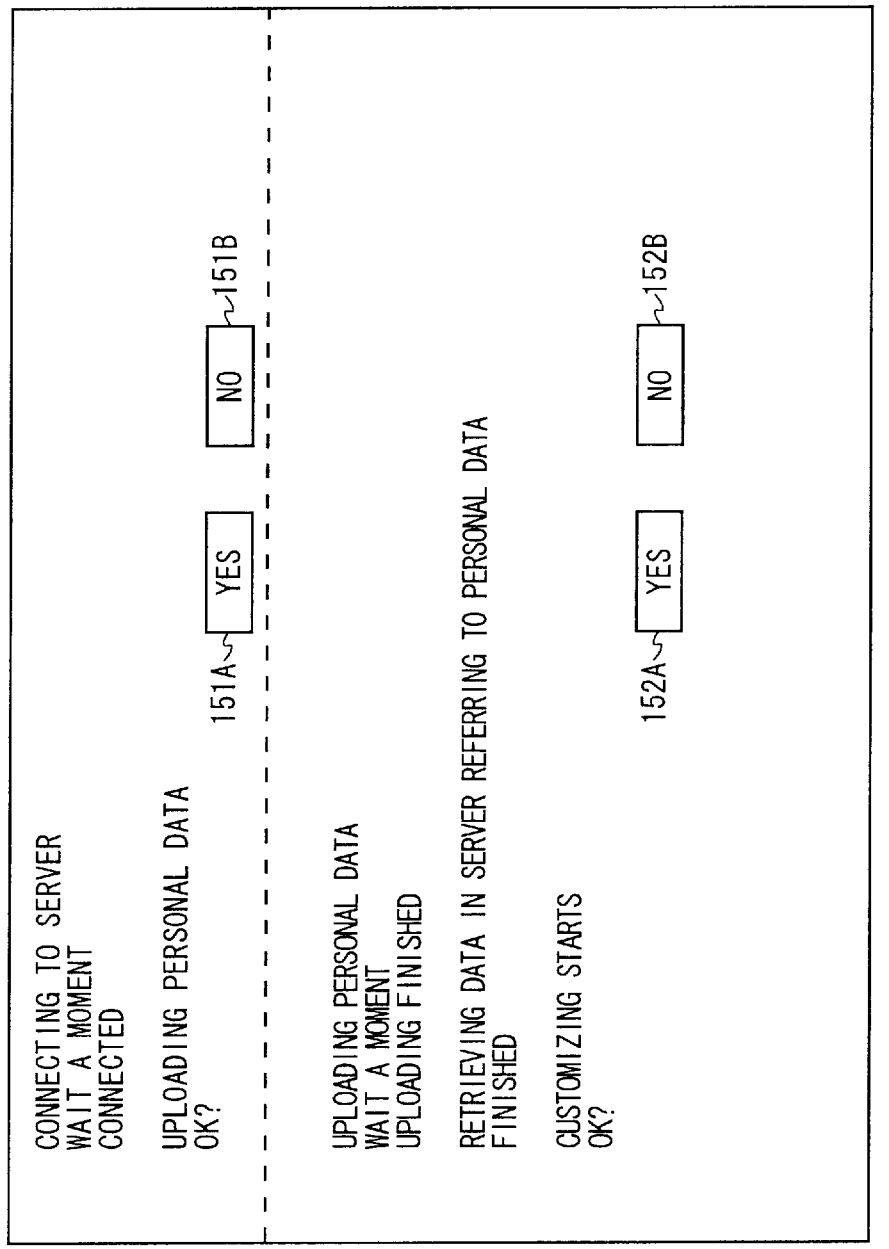
FIG. 21 is a schematic diagram showing a GUI screen appearing on the display of a personal terminal.

A GUI screen 150 as shown in FIG. 21, appears on the display of a personal terminal 43A–43D at this time. A message "Uploading personal computer. OK?" is displayed on the GUI screen 150 at the initial stage, along with a "Yes" button 151A and "No" button 151B.

When the personal data of the pet robot 1 may be uploaded into the server 45, the user only has to click the "Yes" button 151A out of a "Yes" button 151A and "No"

button 151B by the user, then the personal data retained in the memory 10A of the pet robot 1 can be uploaded into the server 45 (Step SP41).

The CPU 62 of the server 45 retrieves the above pet robot information database, and detects the owner (user) of the pet robot 1 based on the uploaded personal data (Step SP42).

Figure 22:
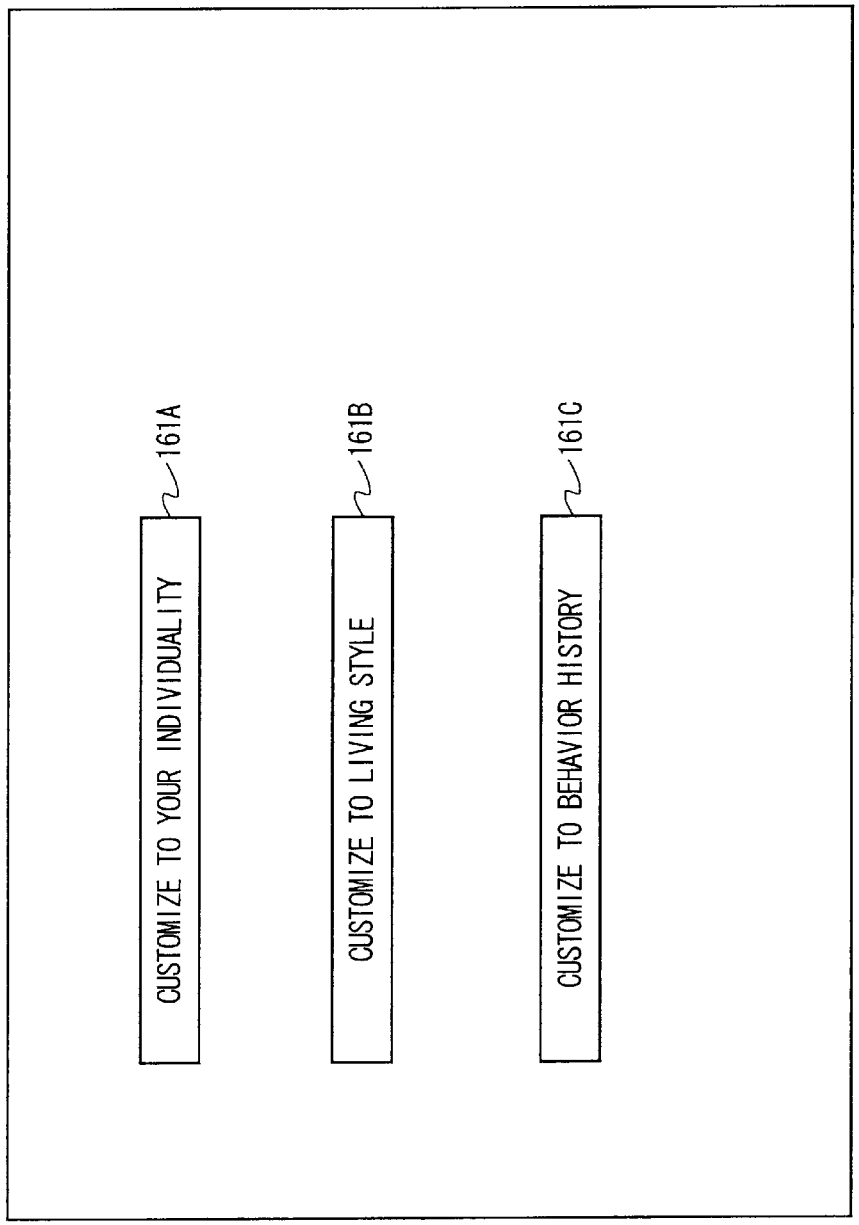
FIG. 22 is a schematic diagram showing a GUI screen appearing on the display of a personal terminal.

A message "Customizing starts. OK?" is displayed on this GUI screen 150, along with a "Yes" button 152A and "No" button 152B, and the clicking of the "Yes" button 152A brings about a GUI screen 160 as shown in FIG. 22 on the display of the personal terminal 43A–43D.

The GUI screen 160 is a screen to select a condition from among the three, on which the control data of the pet robot 1 is customized: individuality of the user, life style of the user, or behavior history of the pet robot 1. First to third buttons 161A–161C are displayed, oriented to these three conditions respectively.

In the case that a user purchases the control data of the pet robot 1 anew, or that the behavior history data of the pet robot 1 is not registered in advance, the only first and second buttons 161A and 161B are displayed on the GUI screen 160, and the third button 161C is not displayed.

In this way the user can select a desired condition using the GUI screen 160, and so, when the user wants to have the control data of the pet robot 1 customized according to the user's own individuality, he/she is to click the first button 161A (Step SP43).

At this time, based on the user information of the user stored in the hard disk drive 64, the CPU 62 of the server 45 performs processing, such as modifying a behavior model so that the pet robot 1 can embody a behavior pleasing to its owner of his/her age by way of example, or setting a language as a subject of recognition to that the owner uses when performing voice recognition. (Step SP44).

Also, when a user wants to have the control data of the pet robot 1 customized according to the user's life style on the GUI screen 160, the second button 161B is to be clicked.

At this time the CPU 62 of the server 45 conducts such processing as modifying a behavior model so that the pet robot 1 does not walk so much if the room of a user is small, or editing related control parameters such that the pet robot 1 walks in a way that matches the floor material of a user's room, based on the living environment of the user stored in the hard disk drive 64 (Step SP45).

Furthermore, when a user wants to have the control data of the pet robot 1 customized according to the behavior history of the pet robot 1 on the GUI screen 160, the third button 161C is to be clicked.

In this case, based on the behavior history of the pet robot 1 stored in the hard disk drive 64, if the daily average number of steps the pet robot 1 takes is small for example, the CPU 62 of the server 45 modifies the behavior model so that the pet robot 1 does not walk so much, judging that the room is small, or if the accumulated numbers of being "patted" and "stroked" are small, the CPU 62 of the server 45 performs processing such as making a reaction to being "patted" or "stroked" of the pet robot 1 more showy to attract the interest of the user, judging that the user does not attend so much to the pet robot 1 (Step SP46).

Then, the CPU 62 creates software to be downloaded into the pet robot 1 finally (Step SP47) with the use of the control data obtained as a result of such processing (Steps SP46, SP47, or SP48), which is then downloaded into the pet robot 1 through a personal terminal 43A–43D (Step SP48).

Furthermore, the CPU 62 performs charge processing to withdraw the charge for such a customization service from the account of the user (Step SP49), then terminates the customization service.

With the robotic system 40 thus designed the control data of the pet robot 1 can be downloaded into the pet robot 1, customized based on the circumstances of the user, user's living environment, or behavior history of the pet robot 1.

Next, explanation is given on a promotion function installed in the server 45. In this robotic system 40 the server 45 is installed with a function to perform promotion (business) to users whose user information and living environment information, etc. are registered.

Figure 23:
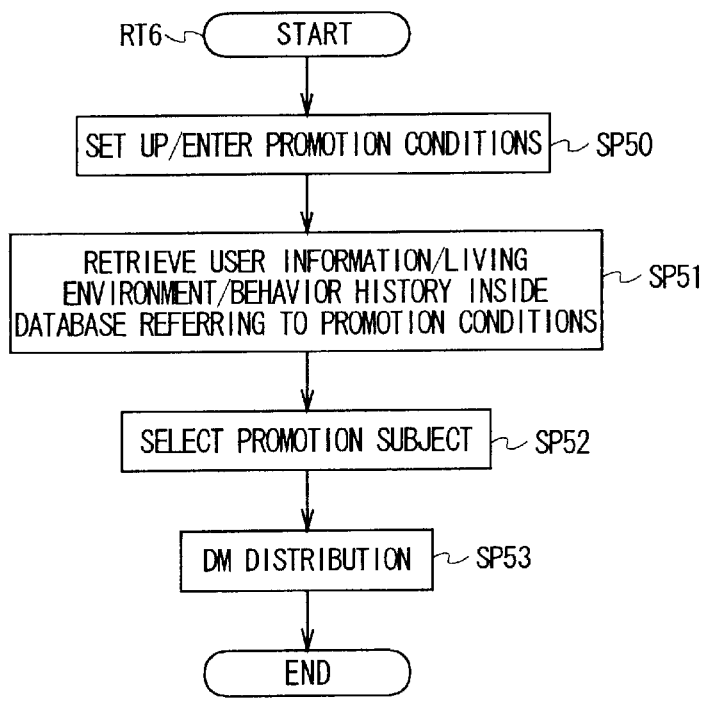
FIG. 23 is a flowchart showing promotion processing procedure.

With the promotion mode selected, the CPU 62 of the server 45 performs such promotional processing following a promotion processing procedure shown in FIG. 23.

In practice, when promotion conditions are set up, or entered (Step SP50) in the promotion mode, the CPU 62 retrieves the user information, living environment information of each user, and the behavior history of the pet robot 1 stored in the hard disk drive 64 (Step SP51), and determines a user matching selected conditions (Step SP52).

Then, later the CPU 62 sends direct mails (DM) to each of those users selected in this way (Step SP653). Thus, the server 45 is designed to conduct promotion to users matching promotion conditions set up or entered.

(3) Operations and Effects of Present Mode of Embodiment

In the robotic system 40 structured as described hitherto, special codes 80 are telecast, and the pet robot 1 embodies behaviors corresponding to those special codes 80 the pet robot 1 watches or hears, or embodies new behaviors not performed up until that time.

Accordingly, with the robotic system 40 the fun of the pet robot 1 as an entertainment robot can be increased because it is possible to let the pet robot 1 embody behaviors according to television programs or television commercials, or new behaviors.

Practically, by registering on the pet robot 1, for example, theme songs or the sound of television programs such as a cartoon or a drama or those of commercials and making the robot recognize them, it is possible to let the pet robot 1 embody behaviors oriented to the television programs or commercials. And in television programs such as cartoons or dramas, for example, various kinds of music attuned to the story (a theme song for the appearance of hero, music of joy, music of sorrow) or fixed sounds for special effects sound are often inserted. By registering on and bring recognized by the pet robot 1, it is possible to let the robot embody behaviors with the emotion synchronized with the user.

Also, in the robotic system 40 special codes 80 are telecast, oriented to newly-created behaviors, and seeing or hearing them the pet robot 1 retains the code number (intrinsic code number 82) of those special codes 80, and downloads suitable behavior generation control data D10 based on those intrinsic code numbers 82 from the server 45 into the pet robot 1.

Accordingly, in this robotic system 40 it is possible to let the pet robot 1 conduct commercial ads for products of sponsors for example, with behaviors appealing to users oriented to special codes 80, in addition to the capability of the pet robot 1 learning new behaviors in succession.

Furthermore, in the robotic system 40 the degree of attention the user may embrace towards the pet robot 1 can be increased because the control data of the pet robot 1 can be customized based on the user's circumstances, living environment, or behavior history of the pet robot 1.

According to the structure so far described, it is possible to let the pet robot 1 embody behaviors matching television programs and television commercials, or new behaviors, so that the fun of the pet robot 1 as an entertainment robot may be increased, thus realizing a robotic system that can enhance the entertainingness of the pet robot 1.

Also, according to the structure so far described, special codes 80 are telecast, oriented to newly-created behaviors, and upon seeing or hearing them the pet robot 1 retains the intrinsic code numbers 82 of those special codes 80 to download into the pet robot 1 itself from the server 45 suitable behavior generation control data 10 based on those intrinsic code numbers 82, so that it is possible to let the pet robot 1 perform commercial ads of products of sponsoring businesses with behaviors appealing to users matching the special codes 80, thereby resulting in realization of a robotic system that may enhance the entertainingness of the pet robot 1.

Furthermore, according to the structure so far described, because the control data of the pet robot 1 can be customized based on user's circumstances, living environment, or the behavior history of the pet robot 1, the affection of the user of the pet robot 1 can augmented, thus realizing a robotic system that may enhance the entertainingness of the pet robot 1.

(4) Other Modes of Embodiment

In the foregoing modes of embodiment, explanation is given on the case where a special code 80 composed of two-dimensional bar codes is applied as a mark to be displayed on the television receiver 42 in the embodiment behavior control service. However, the present invention is not limited to it, but a wide variety of other marks can be applied as a mode of a special code 80. It is possible to widely use a specific color or a flash on specific wavelengths other than a specific shape. In this case, it is indeed possible to insert specific light information into a television program image or a commercial image as in the foregoing modes of embodiment.

Furthermore, in the foregoing modes of embodiment, explanation is given on the case where the special code 80 composed of a scale command is applied for a specific sound information to be sounded from the television receiver 42 in the embodiment behavior control service. However, the present invention is not limited to it, but a wide variety of other structures may be applied for the special code 80. For example, all sound instead of scales may be widely used such as a specific music, sound on a specific wavelength that is inaudible to the human or of a specific person's voice, or words (fixed words such as "Good morning, Robot." or "Good night, Robot.", for example). In this case, such specific sound information may be inserted into television program images or commercial images as in the foregoing modes of embodiment. When using the scale command for specific sound information, either an absolute scale or a relative scale with a first tone as the reference can be used.

Furthermore, in the foregoing modes of embodiment, explanation is given on the case where special codes 80 are distributed in the embodiment behavior control service. However, the present invention is not limited to that, but behavior generation control data D10 itself may be distributed in providing the behavior generation control data service for example.

Furthermore, in the foregoing modes of embodiment, explanation is given on the case where broadcast equipment of a broadcast station 41 and a television receiver 42 are applied (information such as special codes 80 is distributed utilizing telecast) as information distribution means for distributing special light or sound information (special codes 80 in this mode of embodiment) in the embodiment behavior control service. However, the present invention is not limited to it, but special codes 80 may be distributed (including selling and free distribution) utilizing networks such as radio broadcast and the Internet or removable storage media such as magnetic tapes or CDs (Compact Discs) for example.

Figure 6:
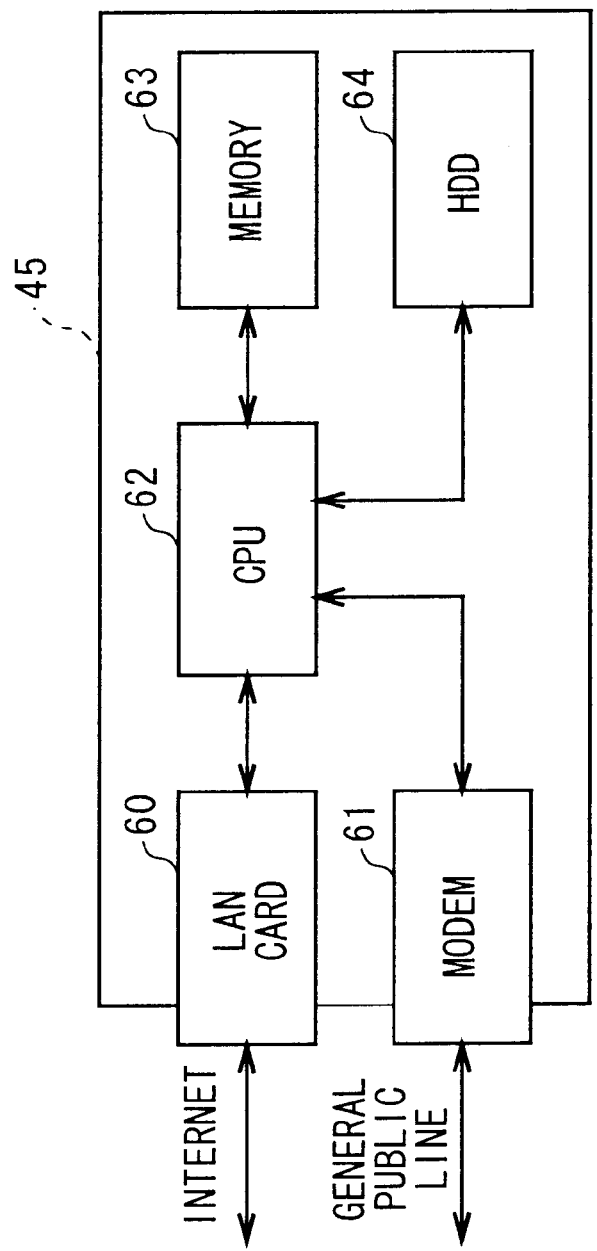
FIG. 6 is a block diagram showing the outline of the structure of a server.

Furthermore, in the foregoing modes of embodiment, explanation is given on the case where the server 45 is structured as shown in FIG. 6, as retaining means for retaining behavior generation control data D10 in the embodiment behavior control service. However, the present invention is not limited to it, but a wide variety of other structures may be applied.

Furthermore, in the foregoing modes of embodiment, explanation is given on the case where the controller 10 inside the pet robot 1 is applied as control means for controlling the embodiment of behaviors of the pet robot 1. However, the present invention is not limited to it, but the controlling means may be placed separately from the pet robot 1.

Furthermore, in the foregoing modes of embodiment, explanation is given on the case where the controlling means for controlling the embodiment behaviors of the pet robot 1, and recognition means for recognizing given information distributed, are structured by the same controller 10. However, the present invention is not limited to it, but they may be structured in separate entities.

Furthermore, in the foregoing modes of embodiment, explanation is given on the case where in the embodiment behavior control service the pet robot 1 is controlled such that the only behaviors prohibited from being embodied up until that time, can be embodied. However, the present invention is not limited to it, but to the contrary the pet robot 1 may be prohibited from embodying behaviors that can be embodied up until that time.

Furthermore, in the foregoing modes of embodiment, explanation is given on the case where behavior generation control data 10 is downloaded into the pet robot 1 in providing the behavior generation control data service. However, the present invention is not limited to it, but the pet robot 1 may be structured so as to retain such behavior generation control data D10 in an external memory for example, so that the behavior generation control data 10 provided from the server 45 may be downloaded from the pet robot 1 into the external memory installed on a personal terminal 43A–43D.

Furthermore, in the foregoing modes of embodiment, explanation is given on the case where behavior generation control data D10 is downloaded into the pet robot 1 in providing the behavior generation control data service. However, the present invention is not limited to it, but behavior generation control data D10 needed may be recorded on recording media by a service company 44 for example, which may be delivered to users by mail and other means. In this case, if the pet robot 1 is structured to move by installing a memory that stores various control data, such memory should naturally be included in the storage media.

Furthermore, in the foregoing modes of embodiment, explanation is given on the case where, in providing the customization service, one and the same server 45 is structured with a modification means for altering control data, from which the pet robot 1 generate behaviors, to meet the pet robot 1 and the user of the pet robot 1, and a transmission means for transmitting modified control data altered by the modification means to a robot. However, the present invention is not limited to it, but they may be structured with a separate server, or may be structured with the personal terminals 43A to 43D with a program that is installed by being downloaded through a network or provided with or without charge in the form of a removable medium such as a CD-ROM.

Furthermore, in the foregoing modes of embodiment, explanation is given on the case where in providing the customization service the control data of the pet robot 1 is modified according to user's circumstances and living environment, or the behavior history of the pet robot 1. However, the present invention is not limited to it, but the control data may be modified according to other conditions than the above.

Industrial Applicability

The present invention can be applied to personal terminals such as robots including a pet robot or other toys, servers or personal computers.

Explanation of Reference Numerals

1—pet robot, 10—controller, 10A—memory, 40—robotic system, 41—broadcast station, 42—television receiver, 43A–43D—personal terminal, 44—service company, 45—server, 50—the Internet, 51—general public line, 62—CPU, 64—hard disk drive, 80—special code, 81—display screen, 82—intrinsic code number, 90, 100, 110, 120, 122A, 122B, 130, 140, 150, 160—GUI screen, D10—behavior generation control data, RT1—embodiment behavior control procedure, RT2—data downloading procedure, RT3—purchasing, customizing, registration content modification procedure, RT4—behavior history data registration procedure, RT5—customizing and downloading procedure.

What is claimed is:

1. A robotic system, comprising:

information distribution means for distributing given information; and controlling means for controlling behaviors of a robot;

wherein said controlling means prohibits said robot from embodying corresponding behaviors out of the behaviors said robot can embody, or withdraws prohibition on said robot embodying corresponding behaviors based on said information distributed by said information distribution means.

2. The robotic system of claim 1 wherein said information distribution means distributes said information utilizing telecast, and specific light and/or sound information corresponding to said information is displayed on or sounded from the television receiver;

and wherein said controlling means comprising:

recognition means for recognizing said specific light and/or sound information displayed on and/or sounded from said television receiver; and behavior embodiment controlling means for prohibiting said robot from embodying corresponding behaviors out of the behaviors said robot can embody, or for withdrawing prohibition on said robot embodying corresponding behaviors based on recognized results by said recognition means.

3. A robot apparatus by comprising:

recognition means for recognizing information to be distributed; and controlling means for controlling embodiment behaviors of said robot apparatus;

wherein said controlling means prohibits said robot device from embodying corresponding behaviors out of the behaviors said robot device can embody, or withdraws prohibition on said robot device embodying corresponding behaviors based on said information recognized by said recognition means.

4. The robot apparatus of claim 3 wherein with said information distributed utilizing telecast, specific light and/or sound information corresponding to said information is displayed on and/or sounded from the television receiver;

wherein said recognition means recognizes said specific light and/or sound information displayed on and/or sounded from said television receiver; and wherein said controlling means prohibits the embodiment of corresponding behaviors out of said behaviors, or withdraws prohibition on the embodiment of said behaviors based on the recognized result by said recognition means.

5. A control method of a robot apparatus, comprising the steps of:

distributing given information; and letting a robot apparatus embody corresponding behaviors based on said information, wherein at the distributing step when said robot apparatus does not have control data to have said behaviors corresponding to said information embodied, said control data is supplied to said robot apparatus, and said robot apparatus is let to embody said behaviors corresponding to said information based on said control data supplied.

6. The control method of a robot apparatus of claim 5 wherein at the letting step said control data is supplied to said robot apparatus via a network.

7. A control method of a robot apparatus comprising the steps of:

distributing given information; and prohibiting the robot apparatus from embodying corresponding behaviors out of the behaviors the robot apparatus can embody, or withdraw prohibition on the embodiment of said behaviors.

8. The control method of a robot apparatus of claim 7, wherein at the distributing step with said information distributed utilizing telecast, specific light and/or sound information corresponding to said information is displayed on and/or sounded from a television receiver; and wherein in the prohibiting step said specific light and/or sound information displayed on and/or sounded from said television receiver is recognized, and based on the recognized result, said robot apparatus is prohibited from embodying said corresponding behaviors, or prohibition on the embodiment of said behaviors is withdrawn.

9. An information processing method comprising the steps of:

modifying control data for a robot to generate behaviors as desired by said robot or a user thereof;

transmitting said control data modified by the modifying step to said robot: and;

wherein at the modifying step said control data is modified based on either said user's circumstances or living environment, or a behavior history of said robot.

* * * * *